United States Patent
Cooley et al.

(10) Patent No.: US 7,604,073 B2
(45) Date of Patent: Oct. 20, 2009

(54) CUTTING ELEMENT APPARATUSES, DRILL BITS INCLUDING SAME, METHODS OF CUTTING, AND METHODS OF ROTATING A CUTTING ELEMENT

(75) Inventors: Craig H. Cooley, Saratoga Springs, UT (US); Timothy N. Sexton, Santaquin, UT (US)

(73) Assignee: US Synthetic Corporation, Orem, UT (US)

( * ) Notice: Subject to any disclaimer, the term of this patent is extended or adjusted under 35 U.S.C. 154(b) by 327 days.

(21) Appl. No.: 11/247,574

(22) Filed: Oct. 11, 2005

(65) Prior Publication Data
US 2007/0079991 A1    Apr. 12, 2007

(51) Int. Cl.
*E21B 10/43* (2006.01)
*E21B 10/62* (2006.01)

(52) U.S. Cl. ....................... 175/432; 175/342

(58) Field of Classification Search ............... 175/342, 175/426, 383, 432
See application file for complete search history.

(56) References Cited

U.S. PATENT DOCUMENTS

| | | | | |
|---|---|---|---|---|
| 1,686,403 A | * | 10/1928 | Boynton | 175/228 |
| 1,723,381 A | | 8/1929 | Seifert | |
| 1,790,613 A | | 1/1931 | Gildersleeve et al. | |
| 2,289,707 A | * | 7/1942 | Hellman | 175/272 |
| 2,879,049 A | * | 3/1959 | Poundstone | 299/80.1 |
| 3,720,273 A | | 3/1973 | McKenry et al. | |
| 3,763,492 A | | 10/1973 | Easton | |
| 4,073,354 A | | 2/1978 | Rowley et al. | |
| 4,200,159 A | | 4/1980 | Peschel et al. | |
| 4,201,421 A | | 5/1980 | Den Besten et al. | |
| 4,222,446 A | | 9/1980 | Vasek | |
| 4,350,215 A | | 9/1982 | Radtke | |
| 4,396,077 A | | 8/1983 | Radtke | |
| 4,511,006 A | * | 4/1985 | Grainger | 175/57 |
| 4,553,615 A | | 11/1985 | Grainger | |
| 4,654,947 A | | 4/1987 | Davis | |
| 4,690,228 A | * | 9/1987 | Voelz et al. | 175/24 |
| 4,720,216 A | | 1/1988 | Smith | |

(Continued)

FOREIGN PATENT DOCUMENTS

WO    WO 86/06990    12/1986

(Continued)

OTHER PUBLICATIONS

International Search Report from related International Application No. PCT/US2006/039692 (Mar. 6, 2006).

*Primary Examiner*—Jennifer H Gay
*Assistant Examiner*—Daniel P Stephenson
(74) *Attorney, Agent, or Firm*—Holland & Hart, LLP

(57) ABSTRACT

A rotary drill bit for drilling a subterranean formation may comprise a bit body, a cutting element coupled to the bit body, and a torque-generating assembly configured to apply torque, either continuously or periodically, to the cutting element. The torque-generating assembly may be powered by the rotary motion of the rotary drill bit or may be hydraulically or electrically powered. The cutting element may comprise a substrate, a table of superabrasive material disposed on an end of the substrate, and at least one impelling feature formed along the exterior surface of the substrate. In addition, a method of rotating a cutting element coupled to a drill bit for drilling a subterranean formation may comprise providing a cutting element comprising a table bonded to a substrate, coupling the substrate of the cutting element to a drill bit body, and applying torque to the substrate of the cutting element.

58 Claims, 12 Drawing Sheets

U.S. PATENT DOCUMENTS

| | | |
|---|---|---|
| 4,751,972 A | 6/1988 | Jones et al. |
| 6,073,524 A | 6/2000 | Weiss et al. |
| 6,733,365 B1 | 5/2004 | Shaw et al. |
| 7,192,226 B2 | 3/2007 | Unsworth |
| 2002/0053472 A1 * | 5/2002 | Kleine et al. ................ 175/394 |

FOREIGN PATENT DOCUMENTS

| | | |
|---|---|---|
| WO | WO 2005/021191 | 3/2005 |

* cited by examiner

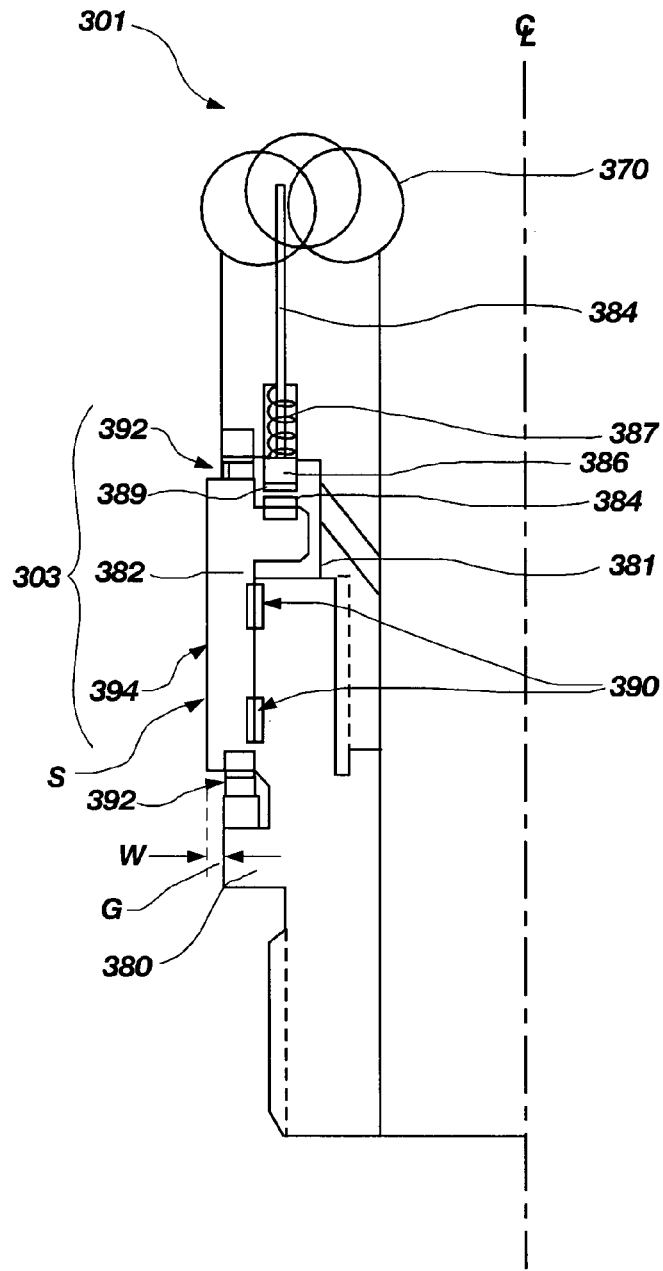
FIG. 8A
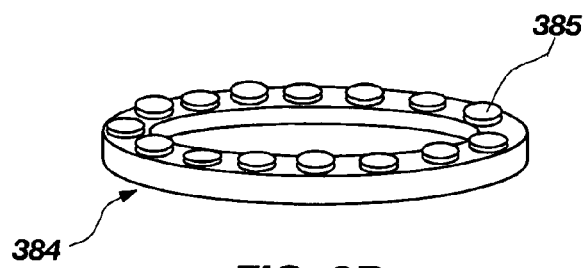
FIG. 8C
FIG. 8B

CUTTING ELEMENT APPARATUSES, DRILL BITS INCLUDING SAME, METHODS OF CUTTING, AND METHODS OF ROTATING A CUTTING ELEMENT

FIELD OF THE INVENTION

The present invention relates generally to cutting elements. More specifically, the present invention relates to methods and apparatuses for applying torque to a cutting element to rotate the cutting element while cutting a material.

BACKGROUND OF THE INVENTION

Cutting elements have been utilized for a variety of material removal processes such as machining, cutting, and drilling. For example, tungsten carbide cutting elements have been used for machining metals and, to some degree, on drilling tools for drilling subterranean formations, as known in the art. Further, polycrystalline diamond compact (PDC) cutters have been employed for machining metals (e.g., non-ferrous metals, usually) and for subterranean drilling tools, such as, drill bits, reamers, core bits, etc. Of course, other types of cutting elements have been utilized for cutting operations, for example, ceramic (cubic boron nitride, silicon carbide, etc.) cutting elements or other cutting elements as known in the art.

For example, it is known to perform lathe operations with a cutting element (e.g., PDC cutter, a tungsten carbide cutting element, or another cutting element as known in the art). Additionally, some machinery (i.e., a planer) is designed to remove or cut material along a selected plane by moving a the piece to be cut against a cutting element. In some configurations, the piece to be cut may be rotated and the cutting element may be radially moved to plane or face a surface of the material. Such machinery may be utilized, among other examples, for forming monuments or building materials (e.g., any rock formation, such as granite, marble, etc.).

More particularly, with respect to subterranean drilling, rotary drill bits employing cutting elements for drilling subterranean formations, such as polycrystalline diamond compact (PDC) cutters, have been employed for several decades. Although other configurations are known in the art, PDC cutters are typically comprised of a disc-shaped diamond "table" formed on and bonded (under high-pressure and high-temperature conditions) to a supporting substrate, such as a cemented tungsten carbide (WC) substrate.

As known in the art, the drill bit bodies to which cutting elements are attached may often be formed of steel or of molded tungsten carbide. Drill bit bodies formed of molded tungsten carbide (so-called matrix-type bit bodies) are typically fabricated by preparing a mold that embodies the inverse of the desired topographic features of the drill bit body to be formed. Examples of such topographic features include generally radially extending blades, sockets or pockets for accepting the cutting elements, junk slots, internal watercourses, passages for delivery of drilling fluid to the bit face, ridges, lands, and the like. Tungsten carbide particles are then placed into the mold and a binder material, such as a metal including copper and tin, is melted or infiltrated into the tungsten carbide particles and solidified to form the drill bit body. Steel drill bit bodies, on the other hand, are typically fabricated by machining a piece of steel to form the desired external topographic features of the drill bit body. In both matrix-type and steel bodied drill bits, a threaded pin connection may be formed for securing the drill bit body to the drive shaft of a downhole motor or directly to drill collars at the distal end of a drill string rotated at the surface by a rotary table or top drive.

Cutting elements are typically attached to matrix-type and steel bodied drill bits by either brazing or press-fitting the cutting elements into recesses or pockets formed in the bit face or in blades extending from the face. The cutting elements are attached to the bit bodies in this manner to ensure sufficient cutting element retention, as well as mechanical strength sufficient to withstand the forces experienced during drilling operations. However, conventional drill bits having conventionally attached cutting elements suffer from a number of drawbacks and disadvantages. For example, because the cutting element is affixed to the bit body, only a portion of the circumferential cutting edge of the cutting element actually engages the subterranean formation being drilled. The constant engagement between this select portion of the cutting edge and the formation tends to quickly degrade and wear down the engaged portion of the cutting edge, resulting in decreased cutting element life, drilling efficiency, and accuracy. This constant engagement also significantly increases the temperature of the cutting element, which may further result in increased wear and/or potential destruction of the cutting element and drill bit body.

Accordingly, a number of conventional attempts have been made to provide a drill bit having cutting elements that are free to rotate during drilling due to interaction with a subterranean formation. For example, U.S. Pat. No. 4,553,615 to Grainger (the '615 patent) discloses a rotary drilling drag bit having a cutting element having a spindle formed of cemented tungsten carbide mounted in a recess formed in the face of a bit blade. A similar configuration is disclosed in U.S. Pat. No. 4,222,446 to Vasek.

However, unpredictability of the nature of contact with the formation being drilled, extreme temperatures, forces, and pressures encountered in subterranean drilling environments may prevent or inhibit rotation of the cutting elements altogether. Thus, such a conventional cutting element, as with brazed or press-fit cutting elements, may exhibit a portion of the cutting edge that tends to degrade and wear down, resulting in decreased cutting element life and drilling efficiency. Similarly, when machining, wear that occurs relative to a cutting element may cause interruptions in the machining operation to replace or otherwise reorient the cutting element.

Accordingly, there exists a need for methods and apparatuses for rotating a cutting element during cutting of a material. The torque applied to the cutting element would be sufficient to rotate, either continuously or periodically, the cutting element during cutting of a material.

SUMMARY OF THE INVENTION

In at least one embodiment, a rotary drill bit for drilling a subterranean formation may comprise a bit body and at least one cutting element coupled to the bit body. Further, the at least one cutting element may comprise a table bonded to a substrate, and a torque-generating assembly may be configured to apply torque to the substrate of the at least one cutting element. The torque-generating assembly may be powered by the rotary motion of the rotary drill bit or may be hydraulically or electrically powered. In addition, the torque-generating assembly may generate and apply torque to the cutting element either continuously or periodically and may comprise an actuator assembly, such as an electric motor assembly, a hydraulic pump assembly, and/or a cam assembly. In certain embodiments, a structural assembly transmits the mechanical motion generated by the actuator assembly to the cutting element. According to one embodiment, the structural assembly comprises a rack coupled to the actuator assembly and a pinion operably coupled to both the rack and a drive shaft affixed to the cutting element.

In one aspect of the invention, a cutting element assembly may comprise at least one cutting element having a table bonded to a substrate and a torque-generating assembly coupled to the at least one cutting element and configured for applying torque to the cutting element. In a further aspect of the invention, a cutting element may comprise a substrate, a table of superabrasive material disposed on an end of the substrate and at least one impelling feature formed into at least a portion of an exterior surface of the substrate.

In addition, yet another aspect of the invention relates to a method of rotating a cutting element coupled to a drill bit for drilling a subterranean formation. More specifically, a cutting element may be provided comprising a table bonded to a substrate and the substrate of the cutting element may be coupled to a drill bit body. Also, torque may be applied to the substrate of the cutting element. A method of drilling a subterranean formation may comprise providing a cutting element comprising a table bonded to a substrate, coupling the cutting element to a drill bit, engaging the subterranean formation with the cutting element, and applying torque to the cutting element.

Further, another aspect of the present invention relates to a method of cutting a material, the method comprising: providing a cutting element comprising a table bonded to a substrate; cutting a material with the cutting element; and rotating the cutting element by applying torque to the substrate of the cutting element while cutting the material with the cutting element.

Features from any of the above-mentioned embodiments may be used in combination with one another in accordance with the present invention. These and other embodiments, features and advantages will be more fully understood upon reading the following detailed description in conjunction with the accompanying drawings and claims.

BRIEF DESCRIPTION OF THE DRAWINGS

The accompanying drawings illustrate exemplary embodiments of the present invention and are a part of the specification. Together with the following description, the drawings demonstrate and explain aspects of the present invention.

FIG. 8A shows a side cross-sectional view of an exemplary embodiment of a rotating sleeve assembly for applying torque to a cutting element.

FIG. 8B shows a perspective view of a cam assembly employed by the rotating sleeve assembly illustrated in FIG. 8A.

FIG. 8C shows a side view of the cam assembly illustrated in FIG. 8B.

Figure 1A:
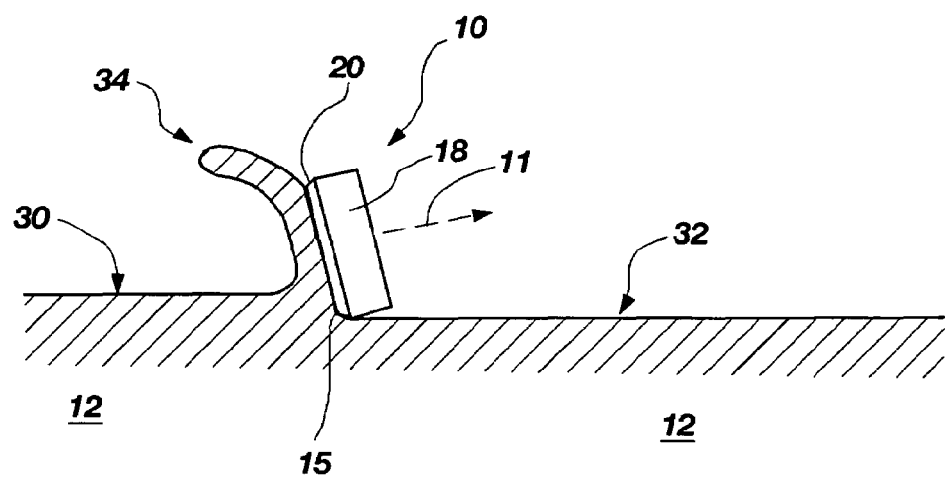
FIG. 1A shows a schematic representation of a cutting element used for cutting a material.

Throughout the drawings, identical reference characters and descriptions indicate similar, but not necessarily identical elements. While the present invention is susceptible to various modifications and alternative forms, specific embodiments have been shown by way of example in the drawings and will be described in detail herein. However, one of skill in the art will understand that the present invention is not intended to be limited to the particular forms disclosed. Rather, the invention covers all modifications, equivalents and alternatives falling within the scope of the invention as defined by the appended claims.

DETAILED DESCRIPTION OF THE INVENTION

For ease of use, the words "including" and "having," as used in the specification and claims, are interchangeable with and have the same meaning as the word "comprising." In addition, as used throughout the specification and claims, the word "cutting" generally refers to any drilling, boring, or the like. The word "cutting," as used herein, refers broadly to machining processes, drilling processes, or any other material removal process utilizing a cutting element.

Figure 1B:
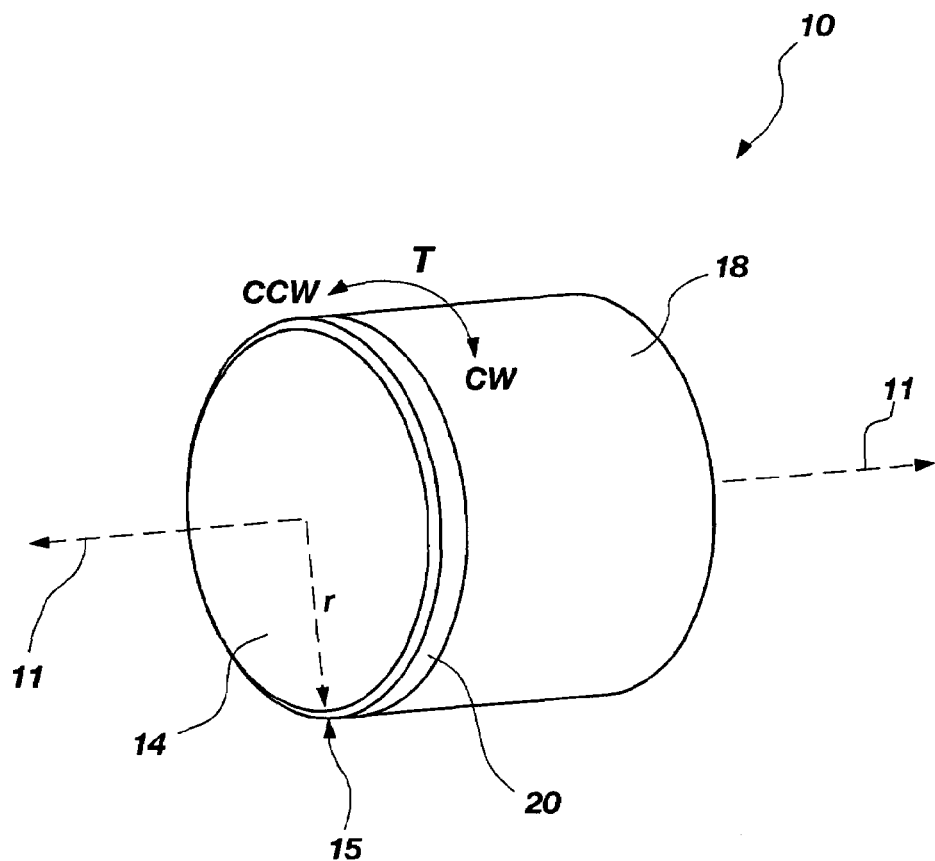
FIG. 1B shows a perspective view of a cutting element.
Figure 1C:
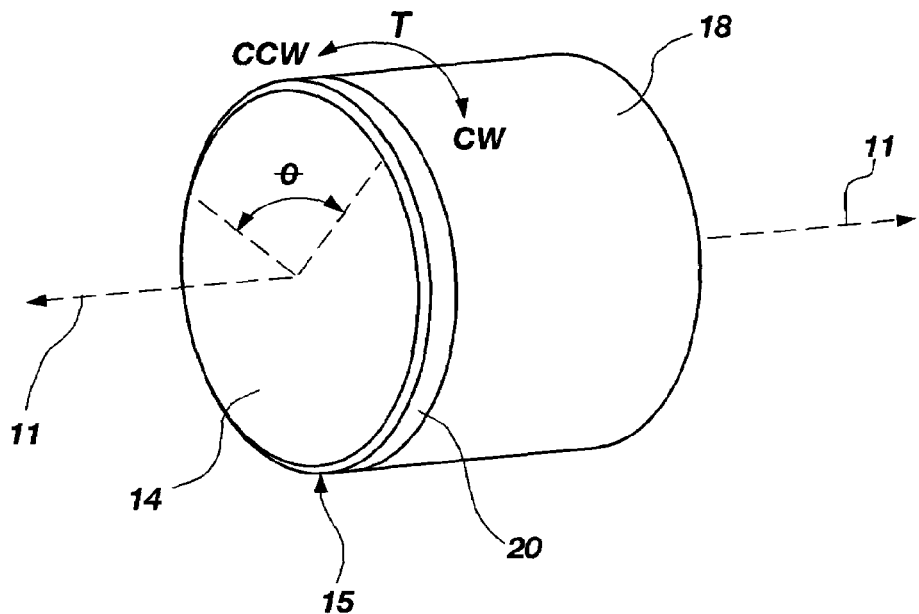
FIG. 1C shows a perspective view of a cutting element and a selected angle θ within which the cutting element may be rotated.
Figure 1D:
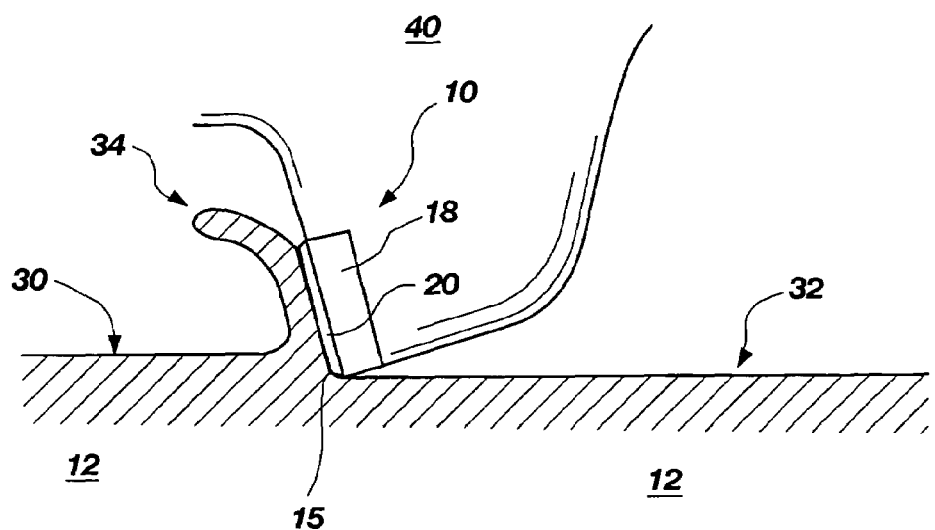
FIG. 1D shows a schematic view of a cutting element used for cutting a material, the cutting element supported by a body.

Generally speaking, the present invention relates to applying a torque to a cutting element during a cutting process. More particularly, a cutting element may be rotated during a cutting process so that a cutting edge is moved during the cutting process. For example, as shown in FIG. 1A, a cutting element 10 may be used for cutting a material 12. Cutting element 10 may comprise, as shown in FIG. 1A, a substrate 18 bonded to a superhard table 20 (e.g., polycrystalline diamond). Thus, in one embodiment, cutting element 10 may comprise a PDC cutter. In further detail, cutting edge 15 of cutting element 10 may be forced against material 12 so that cuttings 34 are removed from surface 30 and cut surface 32 is formed. Cuttings 34 are shown (collectively in the drawings) as a so-called "chip." It is understood that the cuttings may comprise pulverized material, fractured material, sheared material, a continuous chip, or any cuttings produced as known in the art, without limitation. According to one aspect of the present invention, cutting element 10 may be rotated during the process of cutting material 12. Such rotation may introduce a greater portion of a cutting edge 15 of cutting element 10 against material 12, which may reduce wear of the cutting element 10. For example, cutting element 10 may be rotated by applying a torque (labeled "T" in FIGS. 1B and 1C) to substrate 18 of the cutting element 10. In one embodiment, cutting element 10 may be substantially cylindrical and may rotate about central axis 11. FIG. 1B shows another view of cutting element 10. As shown in FIG. 1B, cutting edge 15 (located generally at radius r from central axis 11) may be formed about the circumference of cutting face 14, which may be substantially planar. In addition, as known in the art, cutting edge 15 may include at least one chamfer, at least one so-called buttress geometry, or any other geometry as known in the art. Further, cutting element 10 may be rotated about central axis 11 in a direction of the applied torque T in a direction CW (i.e., clockwise), in a direction labeled CCW (i.e., counter-clockwise), or both (e.g., one direction at a time). Such rotation may cause a selected portion of cutting edge 15 to contact a material (e.g., material 12, as shown in FIG. 1A) cut with cutting element 10. For example, FIG. 1C shows cutting element 10 and a portion of cutting edge 15 encompassed by angle θ. Thus, it may be appreciated that cutting element 10 may be rotated in directions CW and CCW so that a selected region of cutting edge 15 encompassed by angle θ is moved into cutting engagement with a material. Of course, the cutting element may be rotated in at least one direction, substantially continuously or intermittently, so that the entire cutting edge interacts with a material being cut during a cutting process. Of course, it may further be appreciated that cutting element 10 must be supported to resist against the forces of the cutting process. As shown in FIG. 1D, the present invention contemplates that, in one embodiment, a cutting element 10 may be supported, at least in part, by a body 40 (e.g., a bit blade, a cutting element holding base, a lathe cutting element base, a planer cutting element base, etc.).

Figure 2:
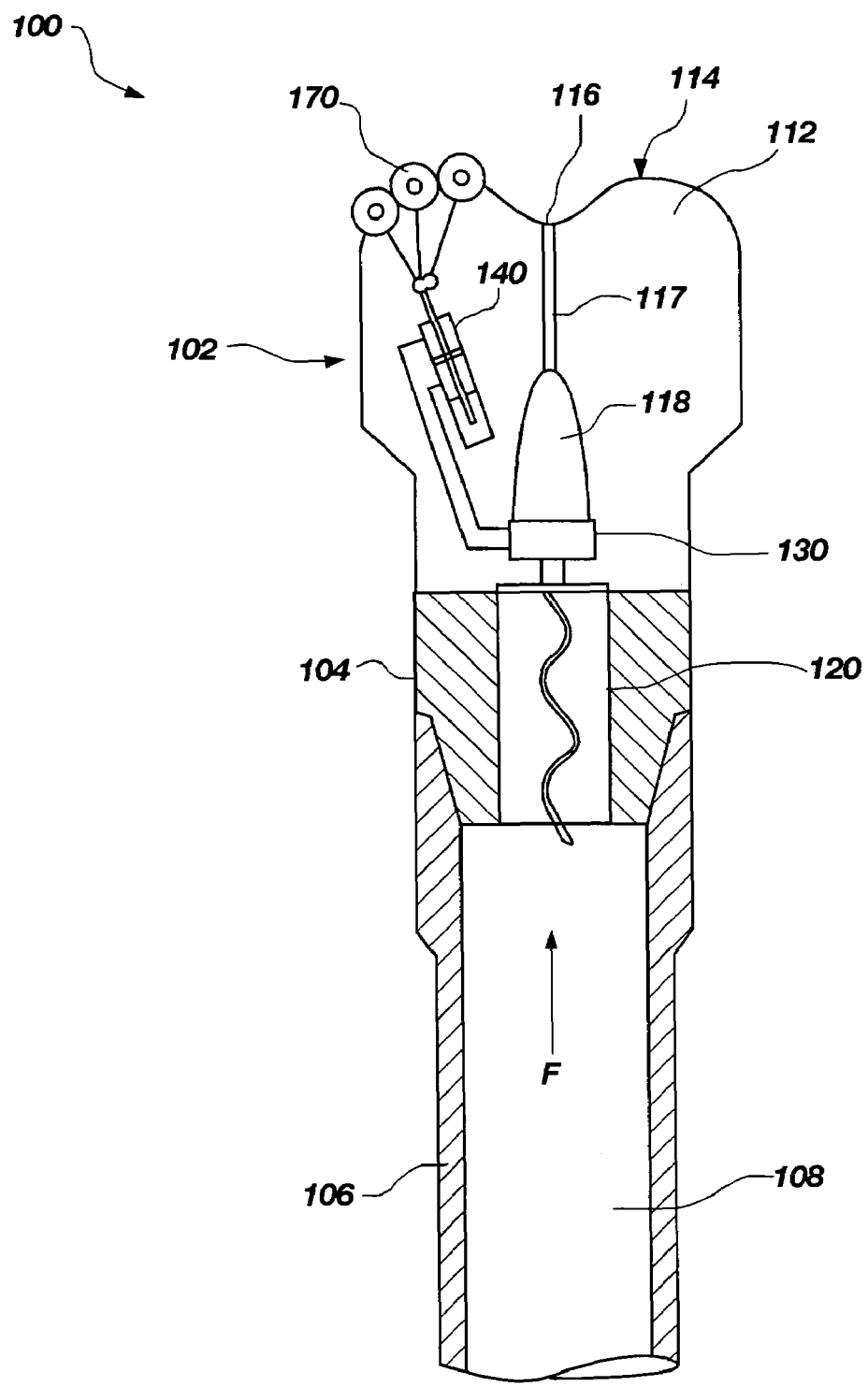
FIG. 2 shows a schematic, side cross-sectional view of an exemplary drilling apparatus and drill bit employing an actuator assembly for applying torque to a rotatable cutting element.

In addition, one aspect and application of the present invention relates to apparatuses and methods for applying torque to a cutting element in order to rotate the cutting element relative to a drill bit body. FIG. 2 is a schematic side cross-sectional view of an exemplary drilling apparatus and drill bit employing an actuator assembly for applying torque to a rotatable cutting element. As seen in the exemplary embodiment illustrated in FIG. 2, exemplary drilling apparatus 100 generally comprises a drill bit 102 having a tapered shank 104 threaded onto a drill string 106, as known in the art. Drill bit 102 generally represents any number of earth-boring or drilling tools, including, for example, core bits, roller-cone bits, fixed-cutter bits, eccentric bits, bicenter bits, reamers, reamer wings, and the like. In at least one embodiment, drill bit 102 comprises a plurality of radially and longitudinally extending blades 112 defining a leading end for drilling into a subterranean structure. Circumferentially adjacent blades 112 may define a plurality of so-called junk slots therebetween for channeling formation cuttings away from a face 114 of drill bit 102. As will be known to those of skill in the art, drill bit 102 may be formed in any number of ways and of any number of materials. For example, drill bit 102 may be machined from steel or may be manufactured by infiltrating a binder of tungsten carbide particulate, as described above.

As shown in FIG. 2, drilling fluids F may be pumped through a bore 108 formed in drill string 106 and into a plenum 118 defined within drill bit 102. As known in the art, at least one passageway 117 defined within drill bit 102 may communicate drilling fluids F to one or more apertures 116 formed in face 114 of drill bit 102. Drilling fluids F emanating from apertures 116 promote flushing formation cuttings away from face 114 while simultaneously cooling blades 112 and cutting elements 170.

According to at least one embodiment, one or more rotatable cutting elements 170 may be mounted to drill bit 102 (e.g., to face 114 or blade 112). Generally speaking, each of cutting elements 170 may comprise any cutting element known in the art capable of cutting a subterranean formation, including, for example, a PDC cutter. As seen in the exemplary embodiment illustrated in FIG. 4A, a cutting element 170 may comprise a layer or table 174 bonded to or formed upon a substrate 172. Table 174 may be formed of any number of materials used for cutting formations, including, for example, a superhard or superabrasive material such as polycrystalline diamond. "Superhard," as used herein, refers to any material having a hardness that is at least equal to a hardness of tungsten carbide. Similarly, substrate 172 may comprise any number of materials capable of adequately supporting a superabrasive material during drilling of a subterranean formation, including, for example, cemented tungsten carbide. For example, cutting element 170 may include a table 174 comprising polycrystalline diamond bonded to a substrate 172 comprising cobalt-cemented tungsten carbide. In such a configuration, table 174 and substrate 172 may be manufactured according to processes known in the art. Optionally, after formation of table 174, a catalyst material (e.g., cobalt, nickel, etc.) may be at least partially removed (e.g., by acid-leaching) from table 174.

Figure 4A:
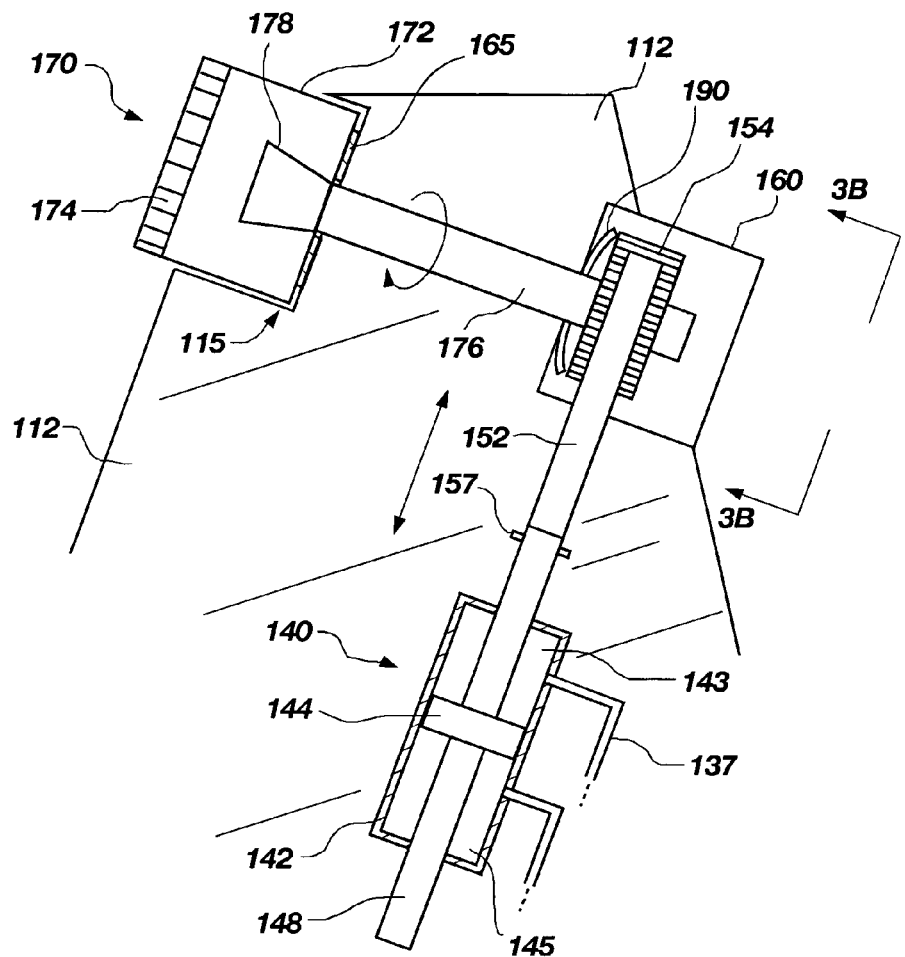
FIG. 4A shows an enlarged cross-sectional view of an exemplary actuator and structural assembly for applying torque to a rotatable cutting element.

The present invention contemplates that cutting elements 170 may be rotatably mounted to face 114 or blades 112 of drill bit 102 in any number of ways and configurations. For example, in at least one embodiment a recess 178 may be defined within substrate 172 so as to retain the distal end of a structural member rotatably attached to a torque-generating assembly housed in drill bit 102. Additional examples of structures for coupling a shaft to a substrate are disclosed in U.S. patent application Ser. No. 11/148,806, filed Jun. 9, 2005, the disclosure of which is incorporated, in its entirety, by this reference. Any of such structures or other suitable structures as known in the art for coupling a shaft to a substrate may be employed to couple substrate 172 to shaft 176, as shown in FIG. 4A. In further detail, in the exemplary embodiment illustrated in FIG. 4A, recess 178 is defined to have a tapered cross-section that embodies the inverse of the shape of the distal end of a drive shaft 176 rotatably attached to a torque-generating assembly (e.g., actuator assembly 140) housed in drill bit 102. Although recess 178 may be formed in any number of sizes or shapes, recess 178 may be formed to exhibit a tapered cross-sectional size that decreases in width in a direction away from table 174. This substantially frusto-conical configuration may provide a robust structure for mechanically retaining the distal end of drive shaft 176 within substrate 172 of cutting element 170. Further, such a configuration may rotatably couple cutting element 170 to a torque-generating assembly (e.g., actuator assembly 140) housed in drill bit 102 (FIG. 2). In further detail, cutting element 170 may be mechanically coupled to a rotatable structural assembly (e.g., drive shaft 176). Accordingly, such mechanical coupling may avoid thermal damage to cutting element 170 associated with conventional brazing techniques.

Referring to FIG. 4A, in one embodiment, each of cutting elements 170 may be rotatably mounted to drill bit 102 by adhering, brazing, welding, or otherwise mechanically affixing substrate 172 of each of cutting elements 170 to a rotatable structural assembly (e.g., drive shaft 176) attached to a torque-generating assembly (e.g., actuator assembly 140)

housed in drill bit 102. For example, the inner surface of recess 178 defined in substrate 172 may be threaded so as to house a structural assembly (e.g., drive shaft 176) having a complimentary threaded outer surface. In another embodiment, each of cutting elements 170 may be rotatably mounted to drill bit 102 in a manner similar to that disclosed in U.S. Pat. No. 4,553,615 to Grainger, the entirety of the disclosure of which is hereby incorporated by this reference. For example, cutting element 170 may include a spindle that is rotatably held in a cutting pocket 115 formed in blade 112 by a resilient split ring (i.e., a lock ring) fitted into a peripheral groove formed along the spindle.

According to certain embodiments, each of cutting elements 170 is rotatably mounted within a respective cutting pocket 115 defined in bit blade 112 of drill bit 102. Cutting pocket 115 of bit blade 112 may be generally configured for surrounding at least a portion of the substrate 172 of cutting element 170. As seen in FIG. 4A, the uppermost edge or tip of table 174 of each of cutting elements 170 may be positioned to extend beyond the upper surface of bit blade 112. Such clearance may be desirable so that each of cutting elements 170 contact the subterranean formation to be drilled, thus cutting and removing material from the formation. A portion of the upper surface of bit blade 112 may be structured for contacting a subterranean formation during drilling to limit a depth-of-cut (i.e., a rate-of-penetration) of a cutting element associated therewith, as known in the art. In addition, optionally, each of cutting elements 170 may be oriented to exhibit a so-called "negative" back rake angle, a side rake angle, or both, as known in the art. Further, each of cutting elements 170 (table 174, substrate 122, or both) may include a chamfer or buttress or may embody any other cutting edge geometry known in the art, without limitation.

Figure 3:
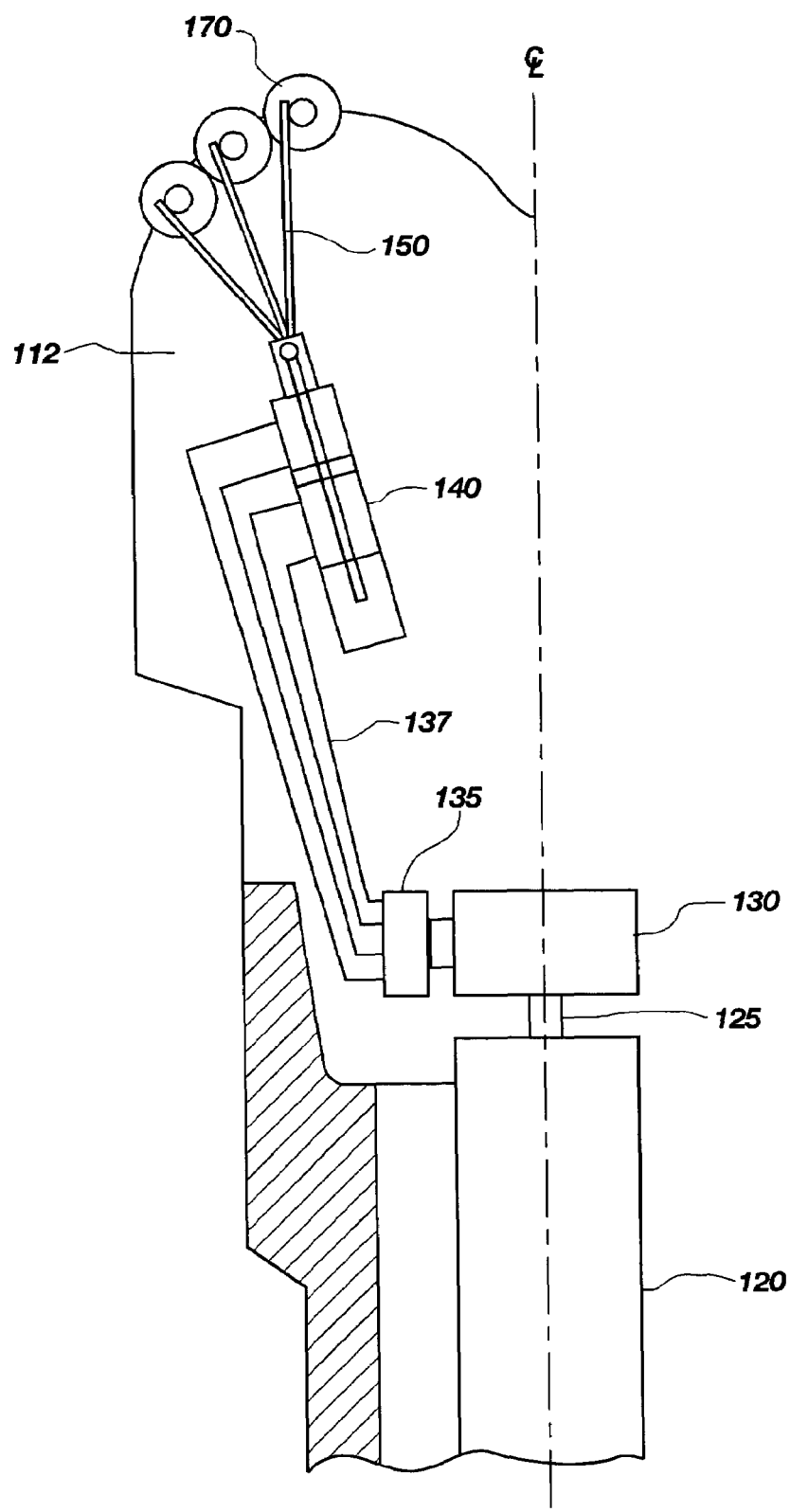
FIG. 3 shows an enlarged schematic view of an exemplary rotary drill bit employing an actuator assembly for applying torque to a rotatable cutting element.

In addition, still referring to the exemplary embodiments illustrated in FIGS. 2 and 3, drilling apparatus 100 may further comprise a motor 120 for powering a pump 130. Motor 120 may be configured to convert the momentum or energy of drilling fluids F into torque to rotate output shaft 125 connected to pump 130. For example, motor 120 may comprise a positive displacement motor for converting the momentum or energy of drilling fluids F flowing through bore 108 in drill string 106 into torque or a force or a moment for rotating output shaft 125, as known in the art. Alternatively, motor 120 may comprise any other configuration or motor capable of driving pump 130, including, for example, a Moineau-type motor, a turbine-type motor, or the like.

In at least one embodiment, pump 130 may be configured to generate pressure (via mechanical energy generated by motor 120) for operating an actuator assembly 140. Pump 130 may comprise any form of pump device capable of operating actuator assembly 140, including, for example, a hydraulic or pneumatic pump such as a gear, vane, or piston pump. In the exemplary embodiment illustrated in FIG. 3, a control valve assembly 135 is configured to control the flow, pressure, or both, of fluid between pump 130 and actuator assembly 140. Control valve assembly 135 may comprise any form of valve or other structure capable of controlling the flow and/or pressure of fluids between pump 130 and actuator assembly 140 (and vice versa). For example, control valve assembly 135 may comprise one or more angle valve, ball valve, block and bleed valve, control valve, directional valve, drain valve, poppet valve, solenoid valve, spool valve, or the like. Control valve assembly 135 may also comprise so-called "double-port" or "multi-port" hydraulic or pneumatic valve configurations, and may be connected to pump 130 via internal or external threads, a bolt or clamp flange, union connection, tube fitting, welds, or the like.

Figure 4B:
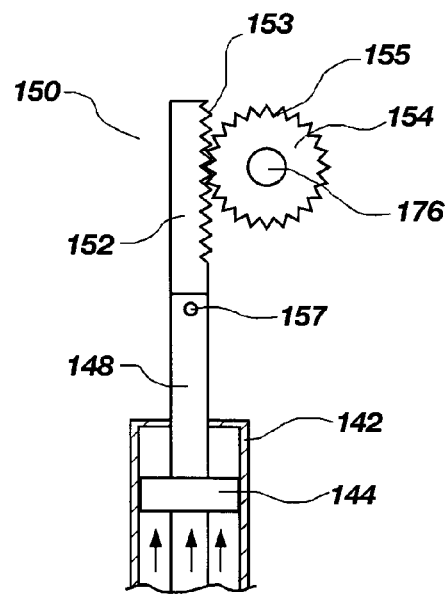
FIG. 4B shows an enlarged cross-sectional view of the exemplary actuator and structural assembly illustrated in FIG. 3A, as taken along the line 3B.

As seen in the exemplary embodiment illustrated in FIG. 3, pump 130 and control valve assembly 135 may be in fluid communication with an actuator assembly 140 housed in drill bit 102 via one or more conduits 137. Conduits 137 generally represent any form of fluid communication device known to those of skill in the art, including, for example, hoses, pipe, or tubing. Actuator assembly 140, in one embodiment, generally represents a device capable of transforming the pressure or flow generated by pump 130 into a torque, or a moment for rotating each of cutting elements 170. In at least one embodiment, actuator assembly 140 converts hydraulic or pneumatic pressure generated by pump 130 into a force that is used to rotate each of cutting elements 170. For example, as illustrated in FIGS. 4A and 4B, actuator assembly 140 may comprise a housing 142 within which a piston 144 is positioned. Also, piston 144 may be mechanically coupled to a piston rod 148. As known in the art, piston 144 is moveable within chamber 142 by generating a pressure differential between chambers 143 and 145 via connections 137. As detailed above, such a pressure difference between chambers 143 and 145 may be controlled by control valve assembly 135 coupled to pump 130.

According to certain embodiments, piston rod 148 of actuator assembly 140 is mechanically coupled to a structural assembly 150. Generally speaking, structural assembly 150 couples piston rod 148 of actuator assembly 140 with rotatable drive shaft 176, to apply torque to substrate 172 of cutting element 170. In the exemplary embodiment illustrated in FIGS. 4A and 4B, structural assembly 150 converts the motion of piston 144 and piston rod 148 into rotary motion (i.e., torque) to rotate drive shaft 176. According to one exemplary embodiment, structural assembly 150 comprises a rack 152 operably coupled to a pinion 154. Rack 152 may be operably coupled to pinion 154 in any number of ways and configurations. For example, as illustrated in the side view of FIG. 4B, a plurality of gear-teeth 153 may be provided along a portion of rack 148 which are engageable with a plurality of complimentary-shaped gear-teeth 155 formed along the circumference of pinion 154. Optionally, a biasing element 190 (e.g., a Belleville washer spring, a coil spring, etc.) may be positioned between the pinion 154 and the bit body (e.g., bit blade 112) so that cutting element 170 is biased toward cutting pocket 115. Of course, any rack-and-pinion configuration as known in the art may be employed, without limitation, for utilizing the motion of actuator assembly 140 to rotate rotatable drive shaft 176. Pinion 154 and at least a portion of rack 152 may be housed within a recess 160 defined within blade 112 of drill bit 102, which may be optionally sealed and pressurized to inhibit exposure to drilling fluid or other environmental conditions.

In the exemplary embodiment illustrated in FIGS. 4A and 4B, piston rod 148 is mechanically coupled to rack 152 via a pin 157 inserted through piston rod 148 and rack 152. Alternatively, piston rod 148 may be mechanically coupled to rack 152 via any number of other structural configurations, including, for example, a so-called "ball-and-socket" structure, a hinged structure, welding, threads, or other coupling configurations as known in the art. In addition, although piston rod 148 is illustrated in FIGS. 4A and 4B as being mechanically coupled to rack 152, piston rod 148 may be configured to rotate pinion 154 directly. For example, a plurality of gear-teeth may be provided along a portion of piston rod 148 and configured to engage the plurality of complimentary gear-teeth 155 formed along the circumference of pinion 154. In another embodiment, a portion of the substrate of a cutting element may include gear-teeth and a rack may engage such gear-teeth directly.

In the exemplary embodiment illustrated in FIGS. 4A and 4B, pinion 154 is mechanically coupled to rotatable drive shaft 176. Generally speaking, pinion 154 may be mechanically coupled to rotatable drive shaft 176 in any number of ways known to those of skill in the art, including, for example, by adhering, brazing, welding, or otherwise mechanically coupling substrate pinion 154 to drive shaft 176. Thus, movement of rack 152 and rotation of pinion 154 may convert the motion of piston 144 and piston rod 148 into rotary motion for rotating drive shaft 176 and cutting element 170. Accordingly, the exemplary embodiment illustrated in FIGS. 3, 4A, and 4B converts the energy or momentum of drilling fluids F into a force or moment (via motor 120, pump 130 and actuator assembly 140, for example) for applying torque to cutting element 170 to rotate the same relative to drill bit 102. During use, a selected magnitude of torque generated and applied to cutting element 170 may be sufficient to rotate the cutting element 170 while performing a cutting operation (e.g., a drilling operation on a subterranean formation). Further, as mentioned above, cutting element 170 may be configured to rotate through a selected angle so that a selected portion of a cutting edge may be used for cutting a subterranean formation.

Although illustrated as comprising a rack 152 operably coupled to a pinion 154, structural assembly 150 may also comprise any number of other structural configurations and/or devices capable of transforming the motion of actuator assembly 140 to rotate shaft 176. For example, structural assembly 150 may comprise a cam mechanism (such as a cam follower assembly), a clutch assembly (such as a Sprag clutch assembly), a freewheel, a ratchet, a transmission or the like. Furthermore, actuator assembly 140 may comprise any device configured to provide a suitable motion for rotating (via structural assembly) shaft 176. For example, actuator assembly 140 may comprise a solenoid or any other actuator as know in the art.

Additionally and optionally, as shown in FIG. 4A, separation element 165 (e.g., a washer or other element) may be positioned between a front surface of cutting pocket 115 and a back surface of substrate 172 of cutting element 170. Separation element 165 may comprise a washer or a layer of material, such as a metal or ceramic shim. In another embodiment, separation element 165 may be configured to reduce friction and/or wear between cutting element 170 and cutting pocket 115. In a further embodiment, separation element 165 may be sacrificial (i.e., may be softer than substrate 172 of cutting element 120 and/or cutting pocket 115). In another embodiment, a coating, such as diamond, silicon carbide, chrome, etc., may be formed (e.g., electroplated, thermally sprayed, sputtered, electrolessly deposited, or otherwise formed or deposited) upon at least one of cutting pocket 115 and substrate 172. Such a configuration may facilitate rotation of cutting element with respect to cutting pocket 115.

Figure 4C:
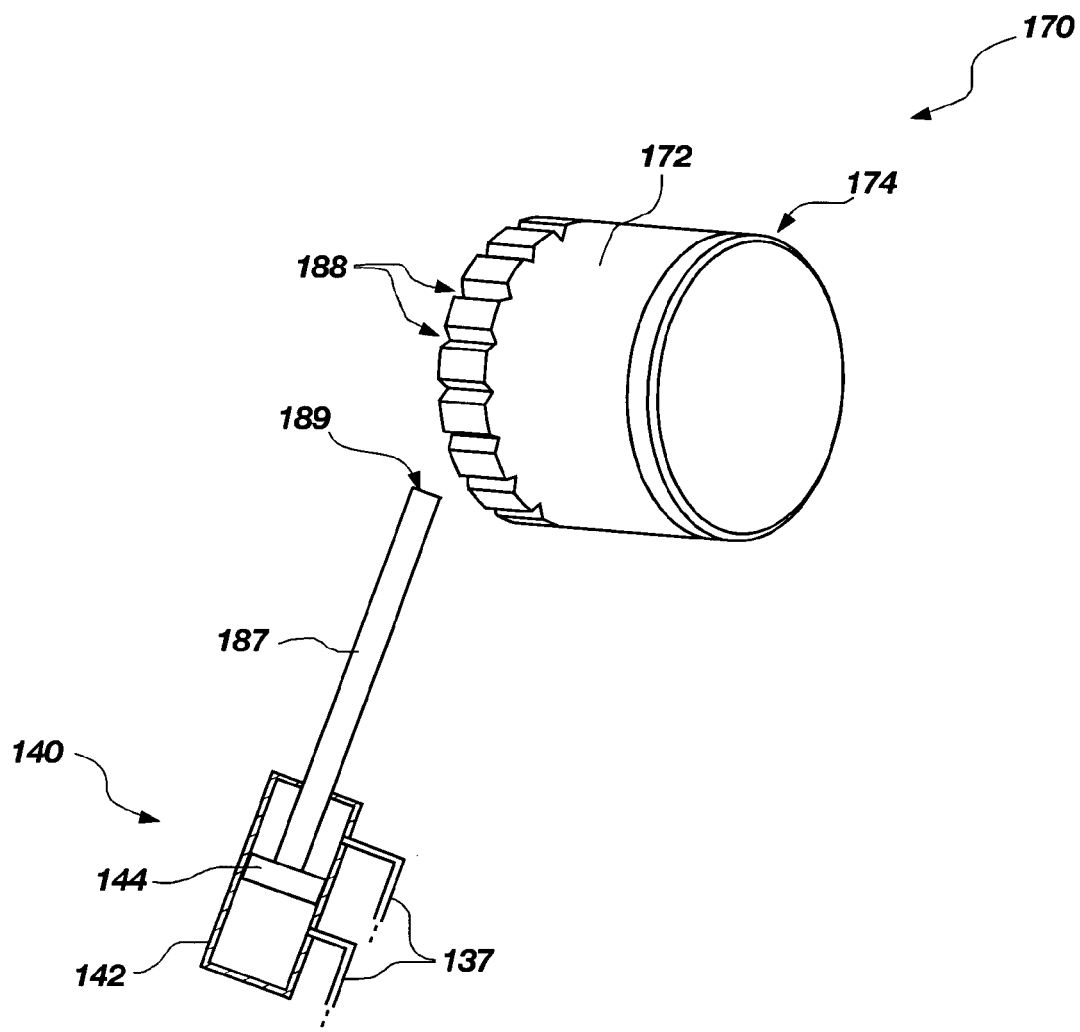
FIG. 4C shows a schematic perspective view of an actuator assembly for rotating a cutting element including a substrate comprising engaging features.
Figure 4D:
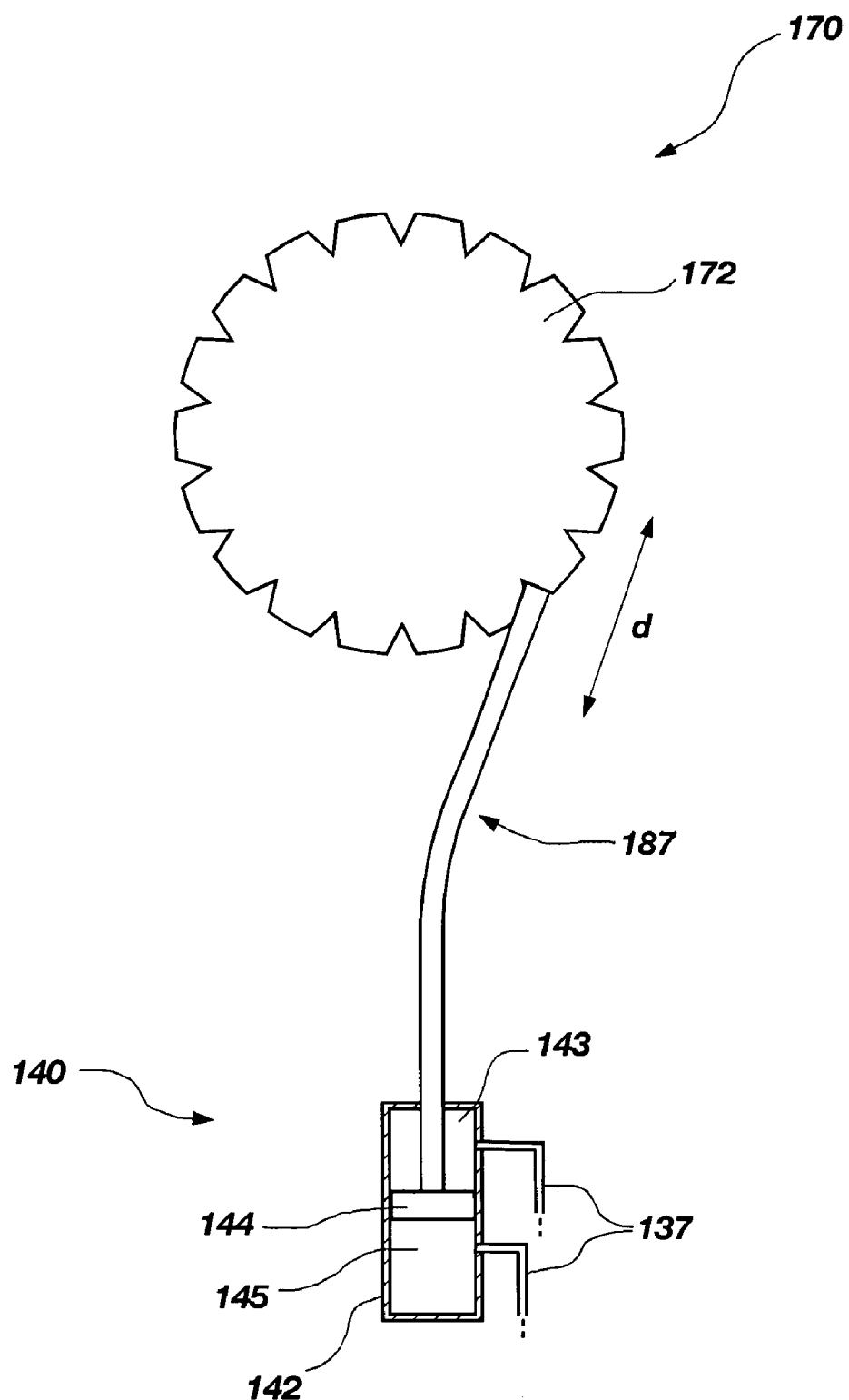
FIG. 4D shows a schematic top elevation view of the actuator assembly and cutting element shown in FIG. 4C.

In a further embodiment, a push rod or other structural member may directly engage a feature formed in the substrate of a cutting element to apply torque to the substrate for rotating the cutting element. For example, FIG. 4C shows an actuator assembly 140 and a push rod 187 configured for engaging the engaging features 188 formed into a substrate 172 of cutting element 170. More particularly, an end 189 of push rod 187 may be structured for interacting with engaging features 188 (e.g., a surface or other aspect of a recess) to rotate cutting element 170. Thus, it may be understood that actuator assembly 140 may cause push rod 187 to reciprocate (i.e., toward and away) with respect to substrate 172. More particularly, as shown in FIG. 4D, push rod 187 may reciprocate along a direction labeled "d." Also, optionally, as shown in FIG. 4D, push rod 187 may be flexible and may be biased (e.g., bent or otherwise biased) toward engaging features 188 formed in substrate 172. Such a configuration may cause the push rod 187 to lock into an appropriately positioned engagement feature 188.

Figure 5:
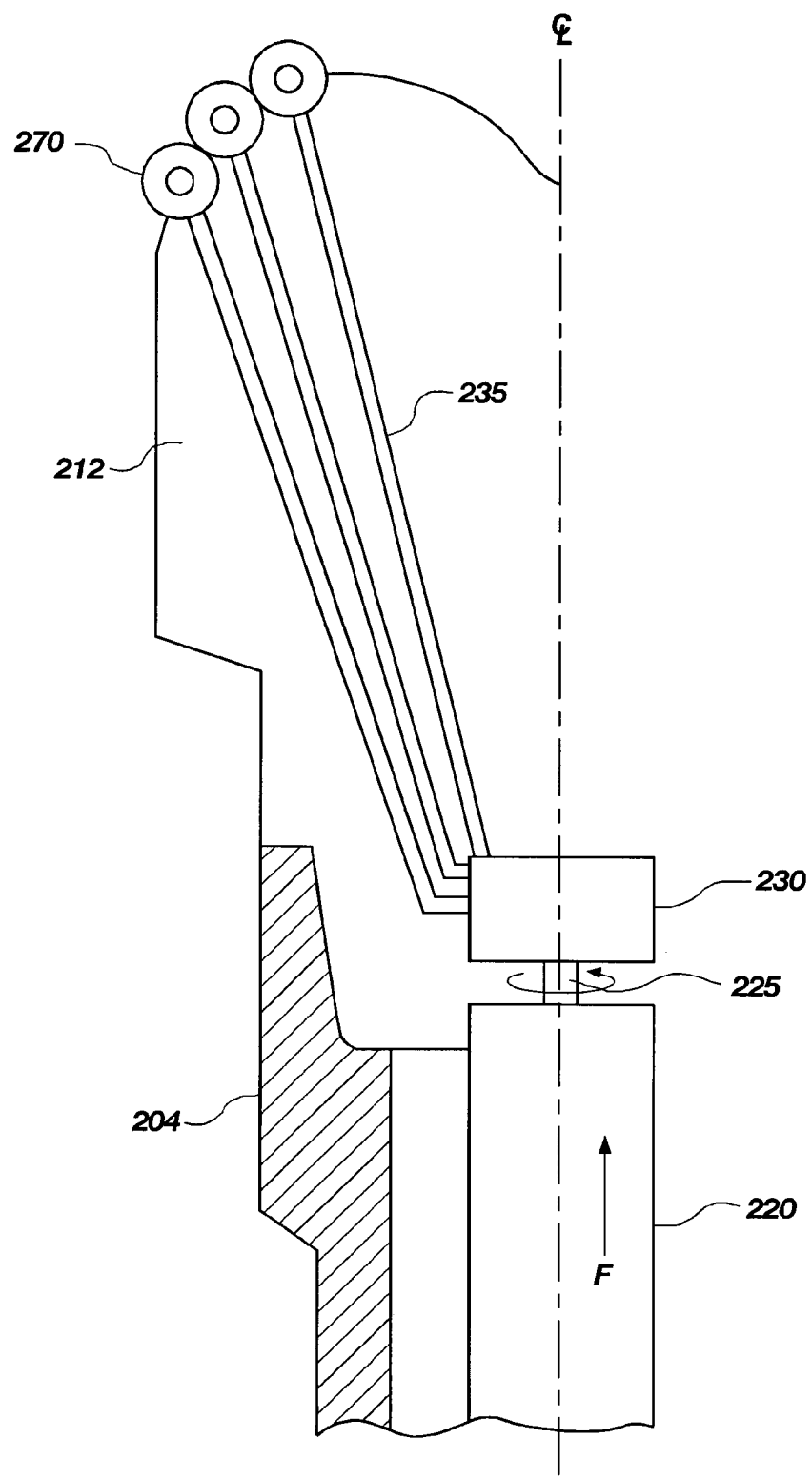
FIG. 5 shows a schematic, side cross-sectional view of an alternative embodiment of a rotary drill bit employing an actuator assembly for applying torque to a rotatable cutting element.

FIG. 5 is a schematic, side cross-sectional view of an alternative embodiment of a rotary drill bit employing an actuator assembly for applying torque to a rotatable cutting element. As illustrated in this exemplary embodiment, a drilling apparatus may comprise a motor 220 for powering a power source 230. In at least one embodiment, motor 220 may be a positive displacement motor for converting the momentum or energy of drilling fluids F flowing through a bore in a drill string into mechanical energy, as known in the art. Thus, motor 220 may convert the flow of drilling fluids F into mechanical energy to rotate output shaft 225 coupled to power source 230 (e.g., an electrical generator, a hydraulic pump, etc.). Alternatively, motor 220 may comprise any other configuration or motor capable of driving power source 230, including, for example, a Moineau-type motor, a turbine-type motor, or the like. Furthermore, the present invention contemplates an individual rotation device or mechanism may be coupled to each of cutting elements 170. For example, a miniature hydraulic motor may be mechanically coupled to each cutting element 170. Such a configuration may eliminate the need for structural assembly 150. Thus, in at least one embodiment, power source 230 is configured to convert the mechanical energy generated by motor 220 into hydraulic energy or electricity for powering a torque-generating assembly, such as actuator assembly 240 or 340 (illustrated in FIGS. 6 and 7, respectively). Generally, in one embodiment, power source 230 may comprise any form of device capable of generating electricity, as known in the art. As seen in the exemplary embodiment illustrated in FIG. 5, power source 230 may be in communication with an actuator assembly (e.g., actuator assembly 240 and/or 340, as discussed below) via one or more connections 235. Connections 235 generally represent any form of electrical conduit known to those of skill in the art, including, for example, electrical cables, wiring, or the like.

Figure 6:
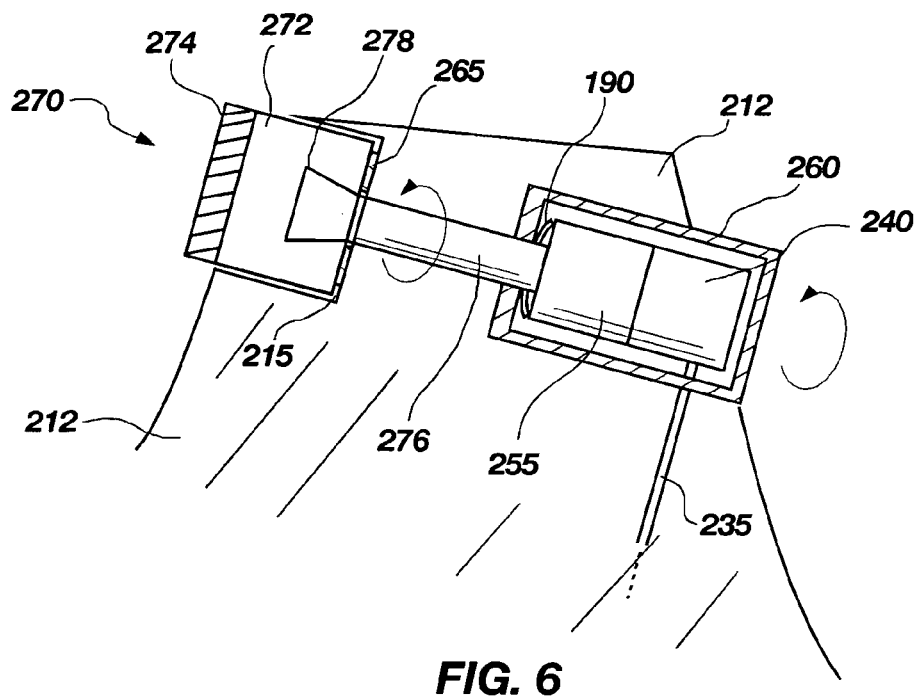
FIG. 6 shows an enlarged cross-sectional view of an additional embodiment of a motor for applying torque to a rotatable cutting element.

More particularly, FIG. 6 shows an enlarged cross-sectional view of an embodiment of an actuator assembly 240 for applying torque to a rotatable cutting element. Actuator assembly 240 generally represents a device capable of transforming electricity or hydraulic energy generated and supplied by power source 230 into torque for rotating cutting element 270. In at least one embodiment, actuator assembly 240 comprises a motor (e.g., an electric motor or a hydraulic motor) that converts the electricity or hydraulic energy generated and supplied by power source 230 into torque. For example, FIG. 6 shows an actuator assembly 240 comprising a relatively compact motor (such as, for example, an electrically-powered geared motor or stepper motor) configured to generate and apply torque to a drive shaft 276 coupled to a substrate 272 of cutting element 270. Optionally, the torque and speed of rotation of drive shaft 276 relative to the torque and speed of rotation generated by actuator assembly 240 may be controlled by a transmission 255 coupled to actuator assembly 240. Generally, transmission 255 may represent a gearbox or other device and may be desirable for converting an unsuitably high speed and low torque generated by an actuator assembly 240 (e.g., an electrically-powered motor) to a lower speed with higher torque, or vice versa.

Similar to the exemplary embodiment illustrated in FIG. 4A, actuator assembly 240 may be housed within recess 260 defined within a blade 212 of a drill bit. Also, optionally, a biasing element 190 (e.g., a Belleville washer spring, a coil spring, etc.) may be positioned between the actuator assembly 240 and the bit body (e.g., bit blade 212) so that cutting element 270 is biased toward cutting pocket 215. Recess 260 may, optionally, be sealed and pressurized to protect actuator 240 from excessive exposure to drilling fluids. As with cutting element 170, cutting element 270 generally represents any form of cutting element capable of cutting a subterranean formation, and is generally comprised of a structure and materials similar or identical to those of cutting element 170. In addition, drive shaft 276 may be mechanically coupled to substrate 272 of cutting element 270 in accordance with any of the above-described embodiments. Also, cutting element 270 may be rotatably mounted within a cutting pocket 215 defined in bit blade 212 of a drill bit. Cutting pocket 215 of bit blade 212 may be generally configured similar to cutting pocket 115 to surround at least a portion of a periphery of cutting element 270 when positioned within cutting pocket 215. In addition, as explained above, a separation element 165 (e.g., a washer element or the like) may be positioned between front surface of cutting pocket 215 and a back surface of substrate 272 of cutting element 270.

Figure 7:
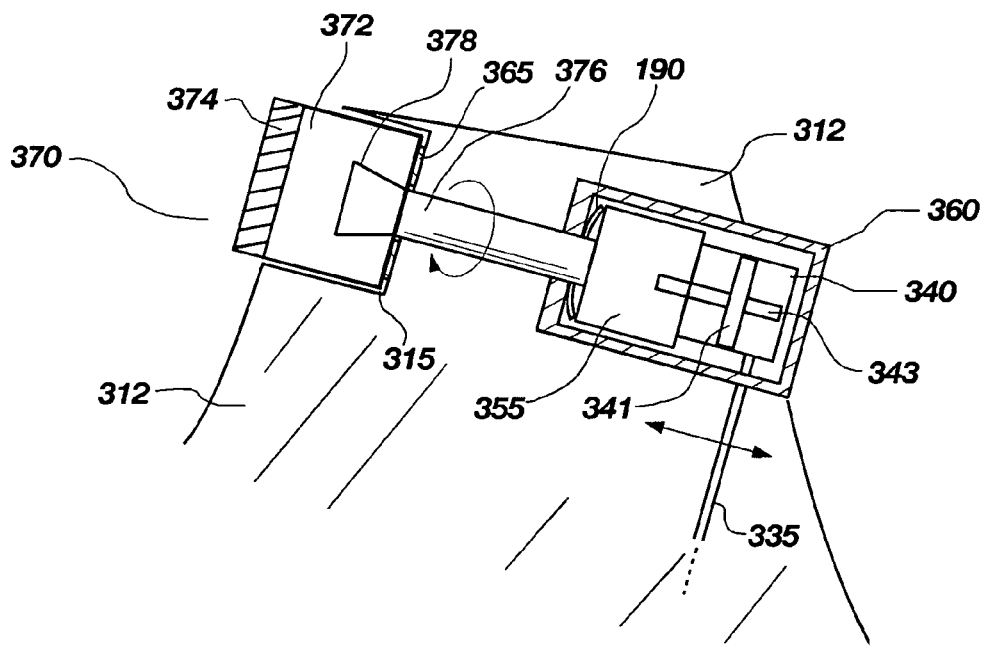
FIG. 7 shows an enlarged cross-sectional view of an additional embodiment of an actuator assembly for applying torque to a rotatable cutting element.

FIG. 7 is an enlarged cross-sectional view of an additional embodiment of an actuator assembly for rotating a cutting element. Particularly, actuator assembly 340 generally represents a device capable of transforming energy (e.g., hydraulic energy or electricity) generated and supplied by a device (e.g., a pump, a generator, or the like) into linear motion for rotating cutting elements 370. In at least one embodiment, actuator assembly 340 may be configured to move a piston rod via electricity generated and supplied by a generator (such as power source 230) via connection 335. For example, actuator assembly 340 may comprise a solenoid or any other device for moving column 341 and may be electrically powered, as known in the art. In another embodiment, actuator assembly 340 may comprise a reciprocating actuator having a column 341 coupled to a piston rod 343 configured to drive a cam assembly 355 coupled to a drive shaft 376 and may be hydraulically powered. Optionally, a biasing element 190 (e.g., a Belleville washer spring, a coil spring, etc.) may be positioned between the actuator assembly 340 and the bit body (e.g., bit blade 312) so that cutting element 370 is biased toward cutting pocket 315. Cam assembly 355 generally represents any form of cam mechanism (such as a cam indexer assembly or a cam follower assembly) capable of converting the linear motion generated by actuator assembly 340 into rotary motion for rotating drive shaft 376. Cutting element 370 generally represents any form of cutting element capable of cutting a formation, and is generally comprised of a structure and materials similar or identical to that of cutting element 170. In addition, drive shaft 376 may be mechanically coupled to a substrate 372 of cutting element 370 in accordance with any of the above-described manners of mechanically coupling drive shaft 176 to cutting element 170. Further, a separation element 165 may be positioned between the cutting pocket 315 of bit blade 312 and the cutting element 370.

Although actuator assemblies 140, 240, and 340 have been described and illustrated as including hydraulic assemblies, electric motors, and cam index assemblies, respectively, these actuator assemblies may comprise any form of assembly or device capable of generating torque for rotating a cutting element, as known in the art. For example, actuator assemblies 140, 240, and 340 may comprise pneumatic motors or pumps, gas-powered motors or pumps, induction motors or pumps, and the like. Such assemblies may include any number of devices, including, for example, fluid-driven motors, turbines, batteries, fuel cells, and the like. The mechanical motion generated by such assemblies may be either rotational, linear, or combinations thereof as desired. These mechanical forces or motions may then be transmitted to a rotatable cutting element by cam mechanisms, clutches, freewheels, ratchets, transmissions or the like.

In at least one embodiment, torque may be constantly generated and applied by a plurality of actuator assemblies 140, 240, and 340 to a plurality of drive shafts 176, 276, and 376 respectively affixed to plurality of cutting elements 170, 270, and 370. Alternatively, these actuator assemblies 140, 240, and 340 may be controlled periodically and, optionally, may generate individually and apply torque to each of the drive shafts affixed to each of a plurality of cutting elements, respectively. In other words, the above-described actuator assemblies may be used to constantly and continuously rotate a cutting element, or may be used to periodically index a cutting element, as needed. As will be understood by those of skill in the art, constant torque may be required in relatively demanding environments, while periodic indexation may suffice when in less demanding conditions, resulting in significant power conservation.

FIG. 8A is a schematic, side cross-sectional view of an exemplary embodiment of a drill bit 301 including a sleeve assembly 303 for applying torque to at least one cutting element 370. FIG. 8B is a perspective view of a cam assembly 384 employed by the sleeve assembly 303 illustrated in FIG. 8A. FIG. 8C is a side view of cam assembly 384 illustrated in FIG. 8B. According to the embodiments illustrated in these figures, an exemplary sleeve assembly for applying torque to a cutting element may comprise a cam follower 386 positioned adjacent to a cam assembly 384, wherein the cam assembly 384 is mounted to a sleeve 382. In at least one embodiment, sleeve 382 exhibits a substantially annular or ring-like shape and may be configured to be rotatably positioned within an annular recess 381 defined generally along the outer circumference or gage portion of a drill bit body 380. Sleeve 382 may be formed of any number of materials or structures known to those of the art, including, for example, tungsten carbide or steel. According to certain embodiments, annular recess 381 defined along the outer circumference or gage portion of drill bit body 380 is formed to substantially embody the inverse of at least a portion of sleeve 382.

As seen in FIG. 8A, one or more radial bearing assemblies 390 may be provided between the inner circumferential surface of sleeve 382 and the outer circumferential surface of recess 381 in drill bit body 380. Generally, radial bearing assemblies 390 may be annularly-shaped and configured to allow sleeve 382 to rotate within recess 381 of drill bit body 380 despite radial loads experienced during subterranean drilling. Radial bearing assemblies 390 generally represent any form of bearing assembly capable of withstanding radial loads, including, for example, polycrystalline diamond bearings (e.g., PDC bearings), radial roller or ball bearings, deep-groove bearings, filling notch bearings, and the like. Similarly, one or more thrust bearing assemblies 392 may be provided between the upper and lower surfaces of sleeve 382 and the inner surfaces of recess 381. Generally, thrust bearing assemblies 392 are annularly-shaped and configured to allow sleeve 382 to rotate within recess 381 of drill bit body 380 despite the axial loads experienced during subterranean drilling. Thrust bearing assemblies 392 generally represent any form of bearing assembly capable of withstanding axial loads, including, for example, polycrystalline diamond thrust bearings, ball thrust bearings, roller thrust bearings, tapered roller bearings, and the like. Radial bearing assemblies 390 and thrust bearing assemblies 392 may be, optionally, lubricated by drilling fluids pumped through drill bit 301.

In the exemplary embodiment illustrated in FIG. 8A, cam assembly 384 is mounted on the upper surface of the inner circumference of sleeve 382. As seen in the exemplary embodiment of FIG. 8B, the body of cam assembly 384 may be formed in a substantially annular shape and may include a plurality of cam inserts 385. In at least one embodiment, each cam insert 385 is formed to have a height that differs slightly from its circumferentially adjacent inserts. For example, as seen in the side view of FIG. 8C, each insert 385 in cam assembly 384 may be formed to have a height that exceeds or differs from circumferentially adjacent inserts, resulting in an undulating cam surface. A superhard material, such as polycrystalline diamond, may be disposed on the upper surface of each insert 385 in cam assembly 384. Of course, generally, inserts 385 may each exhibit a height so that the cam surface of cam assembly 384 causes cam follower 386 to move in a desired manner.

As illustrated in FIG. 8A, cam follower 386 may be housed in drill bit 380 directly above rotating cam assembly 384. In at least one embodiment, cam follower 386 comprises a push rod 388 housed inside a recess formed in the body of drill bit 380 and attached to cam follower 386. Biasing element 387 may comprise a spring or similar structure for biasing push rod 388 in a direction toward cam assembly 384. In at least one embodiment, one end of push rod 388 is mechanically coupled to cutting element 370, while a tracing tip 389 is formed on follower 386. Thus, such a configuration may be configured to trace or follow the generally undulating upper surface of cam assembly 384 according to the configuration of inserts 385. Tracing tip 389 may be formed of any number of materials, including, for example, a superhard material such as polycrystalline diamond.

As seen in FIG. 8A, in at least one embodiment, a formation engaging portion 394 is formed along at least a portion of the outer circumferential surface of rotating sleeve 382. For example, formation engaging portion 394 may be formed to extend beyond recess 381 and the exterior gage surface "G" of drill bit 380 by a distance W. In the exemplary embodiment illustrated in FIG. 8A, formation engaging portion 394 is configured to contact at least a portion of a bore drilled in a subterranean formation. During an exemplary drilling operation, as drill bit 380 is rotated about its axis by a motor within a borehole drilled in a subterranean formation, formation engaging portion 394, which may extend beyond the outer circumferential surface of drill bit 380 by distance W, may contact at least a portion of an inner surface of the borehole. The present invention further contemplates that attributes of the surface, labeled "S," of formation engaging portion 394 may be tailored for "aggressiveness." Put another way, surface S may include gage cutting elements or structures (e.g., natural diamonds, PDC cutters, tungsten carbide elements, or other materials) that may influence that degree to which surface S engages or resists sliding contact with a subterranean formation. The resulting force from contact with the inner surfaces of the borehole may cause rotating sleeve 382, and cam assembly 384 mounted thereon, to rotate with respect to the main body of drill bit 380. As rotating sleeve 382 and cam assembly 384 rotate relative to drill bit 380, tracing tip 389 of cam follower 386 follows the generally undulating upper surface of cam assembly 384 comprised of inserts 385. Thus, push rod 388 (biased by resilient member 386 and connected to tracing tip 389) may be lowered or raised in accordance with the height of each insert 385, resulting in a generally cyclic motion. This resulting cyclic motion by push rod 388 may then be used to rotate cutting element 370 coupled thereto.

Push rod 388 may be coupled to cutting element 370 using any number of configurations or structural assemblies. For example, in at least one embodiment push rod 388 is coupled to cutting element 370 by a structural assembly (such as structural assembly 150, illustrated in FIGS. 4A-4B) comprising a rack-and-pinion assembly for converting the linear reciprocating motion of push rod 388 into rotary motion for rotating a drive shaft affixed to cutting element 370. However, as will be appreciated by those of skill in the art, push rod 388 may also be coupled to cutting element 370 using any number of other structural configurations and/or devices capable of using the linear motion of push rod 388 to rotate cutting element 370.

Thus, a torque may be generated and applied to a cutting element by utilizing the rotary motion of a rotary drill bit, without the need for additional torque-generating assemblies. As will be appreciated, drill bit 380 may comprise any number of earth-boring or drilling tools as known in the art, including without limitation, for example, core bits, roller-cone bits, fixed-cutter bits, eccentric bits, bicenter bits, reamers, reamer wings, and the like. The present invention also contemplates methods for operation of a drill bit 380 as described above. For example, during drilling with a drill bit 380, it may be advantageous to stop movement (rate-of-penetration) and rotate the drill bit 380 to cause interaction between the subterranean formation and the formation engaging portion 394 of the drill bit 380. In this way, at least one cutting element configured to rotate may be indexed (i.e., rotated). It may be appreciated that such rotation may cause so-called "bit whirl," which may cause a formation engaging portion 394 to rotate even if it is not otherwise intended to rotate or, or some other reason, does not rotate during drilling (e.g., the formation engaging portion 394, in one embodiment, may not be designed to contact the subterranean formation during drilling). Summarizing, ceasing rate-of-penetration and rotating a drill bit including a formation engaging portion 394 so that at least one cutting element rotates during such rotation of the drill bit is contemplated by the present invention.

Although actuator assemblies 140, 240 and 340 and cam follower 386 are illustrated in FIGS. 3, 6, 7, and 8A, respectively, as being coupled to each of the cutting elements disposed on a drill bit, in many situations it may prove both difficult and impractical to apply torque to each and every cutting element disposed on a drill bit. Generally, the present invention contemplates that a drill bit may include at least one cutting element that is rotatable by an application of force or torque to the cutting element. Accordingly, in another embodiment, torque may be applied to a plurality of selected cutting elements disposed on a drill bit. For example, torque may only be applied to a plurality of selected cutting elements having the highest work rate, or to those cutting elements that are otherwise highly taxed during the drilling process, as needed. In many embodiments, the cutting elements having the highest work rate are those positioned generally near the nose or generally near the shoulder of a drill bit. For example, on an 8.5 inch diameter drill bit having 35 cutters formed on 4-5 blades, it may only be necessary to apply torque to 12-15 of the cutting elements disposed on the drill bit. Although torque is only applied to a portion of the cutting elements disposed on such an exemplary drill bit, substantial performance gains realized by applying torque to each cutting element disposed on a drill bit (as described below in connection with FIG. 8) are also realized when torque is only applied to those cutting elements having the highest work rate. This selective application of torque to the various cutting elements disposed on a drill bit may thus realize various gains in energy efficiency and simplicity without significant losses in cutting element performance.

It should also be appreciated that any of the above-described embodiments may be implemented with respect to cutting element used for a machining or other cutting operation. For example, a cutting element may be rotated in a machining operation by coupling the cutting element to an output shaft of an electric motor and energizing the motor while machining a material with the cutting element. In addition, it may be appreciated that such a configuration may allow for larger torque-generation apparatuses, since available space may be more ample that within a rotary drill bit.

Figure 9:
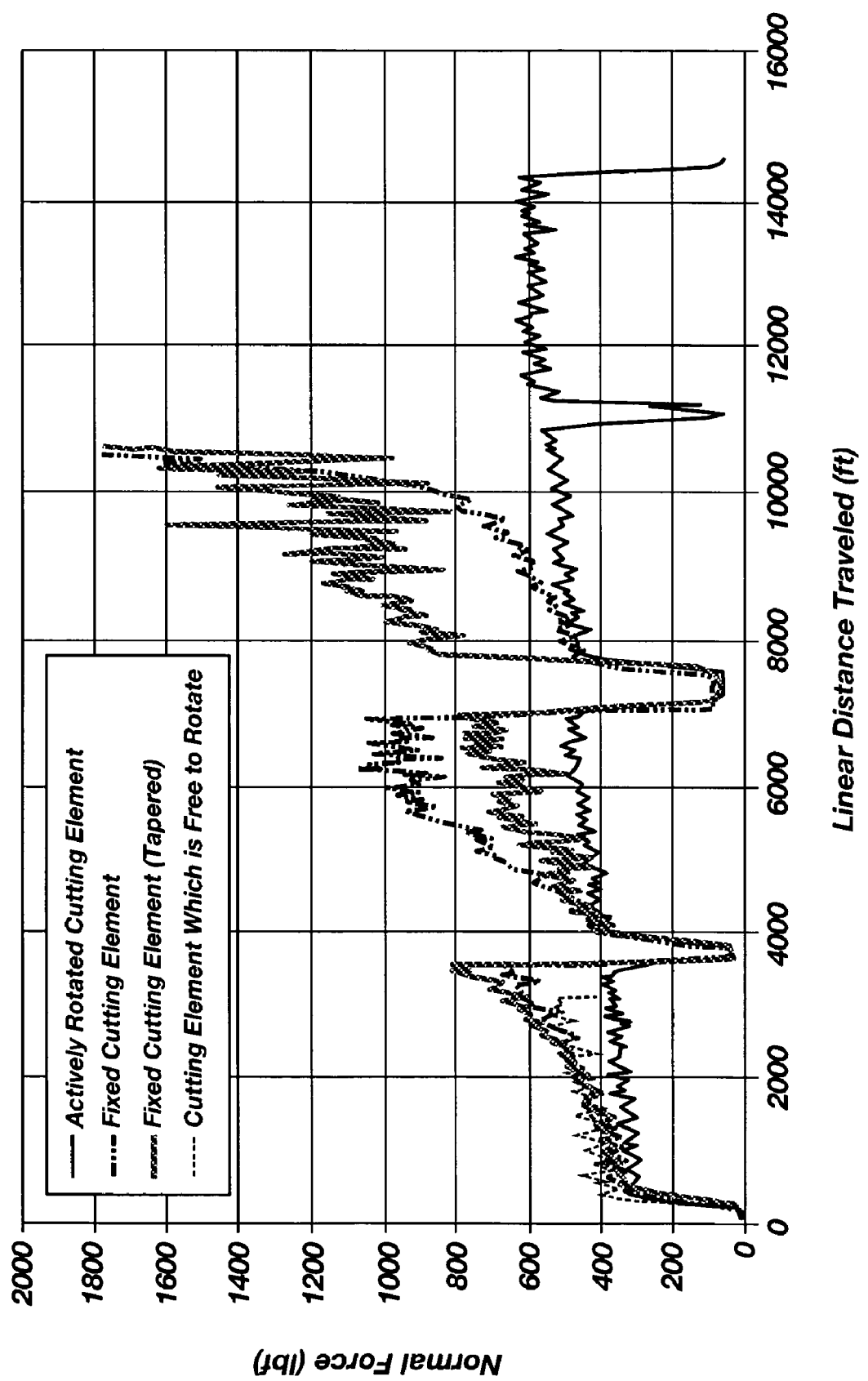
FIG. 9 shows a chart illustrating test data generated by conventional cutting elements and a cutting element according to the present invention.

FIG. 9 is a chart illustrating the advantages of applying torque to a cutting element. More specifically, FIG. 9 illustrates the vertical or weight-on-bit force versus the linear distance traveled for a cutting element cutting Sierra White granite, as obtained using a cutting element evaluation machine configured to force a cutting element through a selected material at a selected depth-of-cut. Further, the data shown in FIG. 9 was produced by forcing a PDC cutter through Sierra White granite while rotating the PDC cutter. More specifically, an electric motor was coupled to a shaft, which was attached to the substrate of a PDC cutter. The electric motor was energized and rotated at a speed of about 5 revolutions per minute while the cutting element was forced (at a selected depth of cut, for example, 0.110 inches) through the Sierra White granite. As evidenced by FIG. 9, cutting elements that are brazed with a cutting pocket (either chamfered or non-chamfered) and cutting elements that are merely free to rotate due to contact with the material being cut exhibit a much shorter lifespan and are not able to function as efficiently as cutting elements that are rotated by application of a torque to the cutting element during cutting (such as cutting elements rotated by a torque-generating member). For example, as seen in FIG. 9, the brazed chamfered or non-chamfered cutting elements that are free to rotate during cutting were destroyed after only having removed approximately 10,000 in$^3$ of Sierra White granite. However, a cutting element to which a torque of sufficient magnitude to rotate the cutting element during cutting continued to operate well after having removed over 14,000 in$^3$ of Sierra White granite. This so-called "actively-rotated" cutting element thus lasted much longer and exhibited much lower vertical force values than brazed cutting elements or cutting elements that were merely free to rotate.

Accordingly, applying torque to at least one cutting element coupled to a drill bit or at least one cutting element coupled to equipment for machining (e.g., a lathe, a so-called planer, or other machinery for cutting materials) may significantly prolong the life of such at least one cutting element. Advantageously, this configuration may also keep the engagement point between the subterranean formation being drilled and the cutting element much cooler since new portions of the cutting element's circumference are continually rotating into the cutting edge. Such a configuration may also advantageously keep the cutting edge of the cutting element much sharper than conventional cutting elements, resulting in increased cutting efficiency. For example, a drill bit may exhibit a higher rate of penetration for a given weight-on-bit, as compared to a conventional drill bit. Potentially, such a configuration may enable the drilling of various subterranean formations that have not been previously drillable by drill bits employing conventional cutting elements.

Figure 10:
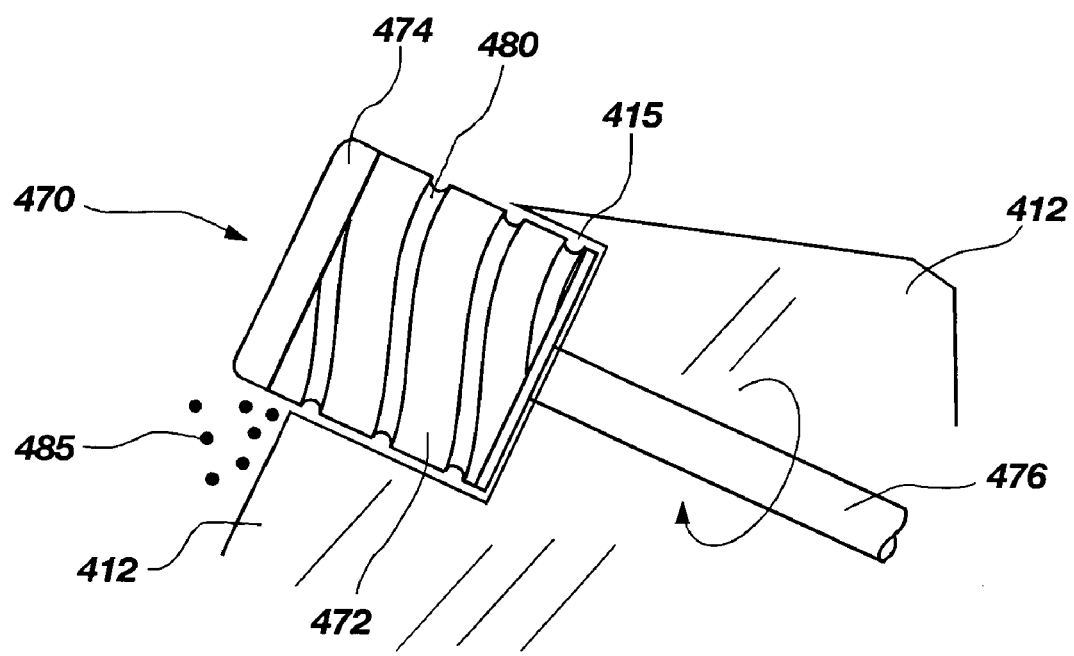
FIG. 10 shows an enlarged view of a rotatable cutting element having an impelling feature.

FIG. 10 is an enlarged view of a rotatable cutting element having an exemplary impelling feature for impelling debris generated by the cutting element. In at least one embodiment, cutting element 470 comprises a table 474 formed on a substrate 472. As with cutting element 170, cutting element 470 generally represents any form of cutting element capable of cutting a formation, and is generally comprised of a structure and materials similar or identical to that of cutting element 170. A drive shaft 476 may be mechanically coupled to substrate 472 of cutting element 470 in accordance with any of the above-described manners of mechanically coupling drive shaft 176 to cutting element 170. In general, drive shaft 476 affixed to substrate 472 of cutting element 470 is configured so as to be rotated by a torque-generating member. For example, drive shaft 476 affixed to substrate 472 of cutting element 470 may be attached to any of the actuator assemblies or cam assemblies previously described. As with cutting element 170, cutting element 470 may optionally be rotatably mounted within a cutting pocket 415 defined in bit blade 412 of a drill bit. Cutting pocket 415 of bit blade 412 may be configured similar to cutting pocket 115, as described above.

According to the exemplary embodiment illustrated in FIG. 10, at least one impelling feature 480 comprises at least one groove formed into at least a portion of an exterior surface of substrate 472. In another embodiment, impelling feature 480 may comprise at least one protrusion formed upon at least a portion of the exterior surface of substrate 472. Impelling feature 480 may be formed in a substantially helical shape. Impelling feature 480 may be formed in the exterior surface of substrate 472 in accordance with any number of processes or techniques. For example, a grinding device may be used to form a groove into at least a portion of an exterior surface of substrate 472 formed of a material such as tungsten carbide. In another example, hard-facing may be applied to at least a portion of an exterior surface of the substrate 472 to form a protrusion. Alternatively, a mold embodying the inverse of the topographical features (such as a helical groove or protrusion) of a desired substrate may be prepared. As will be appreciated by those of skill in the art, impelling feature 480 may be formed to have any number of sizes, widths, and shapes.

As cutting element 470 is rotated by a torque-generating member while drilling a subterranean formation, debris 485 generated by this drilling operation may be channeled or impelled by impelling feature 480 away from and out of cutting pocket 415. Specifically, impelling feature 480 formed along the exterior surface of substrate 472 of cutting element 470 may clear drilling debris 485 from cutting pocket 415 (e.g., similar to an auger). By clearing debris 485 from cutting pocket 415, impelling feature 480 may allow cutting element 470 to freely rotate within cutting pocket 415. Such uninhibited rotation may allow cutting element 470 to maintain a substantially constant rotation speed and torque within cutting pocket 415, resulting in an efficient cutting of the subterranean formation being drilled.

The preceding description has been provided to enable others skilled in the art to best utilize the invention in various embodiments and aspects and with various modifications as are suited to the particular use contemplated. This exemplary description is not intended to be exhaustive or to limit the invention to any precise form disclosed. Many modifications and variations in the form and details are possible without departing from the spirit and scope of the invention. It is intended that the scope of the invention be defined by the following claims.

What is claimed is:

1. A rotary drill bit for drilling a subterranean formation, comprising:
   a bit body;
   at least one cutting element coupled to the bit body, the at least one cutting element comprising a substantially cylindrical, superabrasive table bonded to a substrate; and
   a torque-generating assembly configured to apply torque directly to the substrate of the at least one cutting element and rotate the at least one cutting element relative to the bit body.

2. The rotary drill bit of claim 1, wherein the torque-generating assembly comprises:
   a pump;
   an actuator assembly in fluid communication with the pump; and
   a structural assembly coupling the actuator assembly to a rotatable drive shaft affixed to the substrate of the at least one cutting element.

3. The rotary drill bit of claim 2, wherein the actuator assembly comprises:
   a chamber in fluid communication with the pump;
   a piston disposed within the chamber, the piston moveable between a first position and a second position; and
   a piston rod coupled to the piston.

4. The rotary drill bit of claim 3, wherein the structural assembly comprises:
   a rack coupled to the piston rod; and
   a pinion coupled to the drive shaft and operably coupled to the rack.

5. The rotary drill bit of claim 3, further comprising a control valve assembly in fluid communication with the pump and configured to control the flow of fluid into and out of the chamber.

6. The rotary drill bit of claim 1, wherein the torque-generating assembly comprises:
   a push rod coupled to an actuator assembly, the push rod configured to engage at least one engagement feature formed in the substrate of the at least one cutting element.

7. The rotary drill bit of claim 6, wherein the push rod is flexible and biased toward the at least one engagement feature formed in the substrate of the at least one culling element.

8. The rotary drill bit of claim 6, wherein the actuator assembly is configured to reciprocate the push rod relative to the substrate of the at least one cutting element.

9. The rotary drill bit of claim 1, wherein the torque-generating assembly comprises an electric motor for rotating a drive shaft affixed to the substrate of the at least one cutting element.

10. The rotary drill bit of claim 9, wherein the electric motor is powered by a generator that converts the flow of drilling fluids into electricity.

11. The rotary drill bit of claim 1, wherein the torque-generating assembly comprises:
    a cam assembly coupled to a drive shaft affixed to the substrate of the at least one cutting element; and
    an actuator assembly for actuating the cam assembly.

12. The rotary drill bit of claim 11, wherein the actuator assembly is electrically or hydraulically powered.

13. The rotary drill bit of claim 1, wherein the torque-generating assembly is powered by rotary motion of the rotary drill bit.

14. The rotary drill bit of claim 13, wherein the torque-generating assembly comprises:
    a rotatable sleeve mounted within an annular recess formed along the outer circumference of the bit body, the rotatable sleeve comprising a formation engaging portion configured to engage an inner circumferential surface of a borehole in a formation;
    a cam assembly having an undulating upper surface and mounted on the rotatable sleeve; and
    a cam follower in mechanical communication with the undulating upper surface of the cam assembly and coupled to a drive shaft affixed to the substrate of the at least one cutting element.

15. The rotary drill bit of claim 14, wherein a formation engaging portion comprises natural diamond, tungsten carbide, or a polycrystalline diamond compact cutter.

16. The rotary drill bit of claim 14, wherein the cam follower comprises a push rod biased by a resilient member and coupled to the drive shaft by a rack-and-pinion assembly.

17. The rotary drill bit of claim 1, wherein the substrate is substantially cylindrical.

18. The rotary drill bit of claim 1, wherein the superabrasive table comprises polycrystalline diamond and the substrate comprises cemented tungsten carbide.

19. The rotary drill bit of claim 1, further comprising at least one helical groove formed into at least a portion of an exterior surface of the substrate.

20. The rotary drill bit of claim 1, wherein the torque-generating assembly is configured to continuously or periodically apply torque to the substrate of the at least one cutting element.

21. A cutting element, the cutting element comprising:
    a substrate sized and configured to be coupled with a bit body and configured to receive a direct application of a torsional force to rotate the substrate relative to a bit body;
    a substantially cylindrical table of superabrasive material disposed on an end of the substrate; and
    at least one impelling feature formed into at least a portion of an exterior surface of the substrate.

22. The cutting element of claim 21, wherein the at least one impelling feature comprises a helical groove configured to impel debris generated by the cutting element when the cutting element is rotated.

23. A cutting element assembly for use in cutting a material, the cutting element assembly comprising:
    at least one cutting element comprising a substantially cylindrical, superabrasive table bonded to a substrate; and
    a torque-generating assembly coupled to the at least one cutting element and configured for directly applying torque to the substrate of the at least one cutting element.

24. The cutting element assembly of claim 23, wherein the torque-generating assembly comprises:
    a pump;
    an actuator assembly in fluid communication with the pump; and
    a structural assembly coupling the actuator assembly to a rotatable drive shaft affixed to the substrate of the at least one cutting element.

25. The cutting element assembly of claim 24, wherein the actuator assembly comprises:
    a chamber in fluid communication with the pump;
    a piston disposed within the chamber, the piston moveable between a first position and a second position; and
    a piston rod coupled to the piston.

26. The cutting element assembly of claim 25, wherein the structural assembly comprises:
   a rack coupled to the piston rod; and
   a pinion coupled to the drive shaft and operably coupled to the rack.

27. The cutting element assembly of claim 23, wherein the torque-generating assembly comprises:
   a push rod coupled to an actuator assembly, the push rod configured to engage at least one engagement feature formed in the substrate of the at least one cutting element.

28. The cutting element assembly of claim 27, wherein the push rod is flexible and biased toward the at least one engagement feature formed in the substrate of the at least one cutting element.

29. The rotary drill bit of claim 27, wherein the actuator assembly is configured to reciprocate the push rod relative to the substrate of the at least one cutting element.

30. The cutting element assembly of claim 23, wherein the torque-generating assembly comprises an electric motor for rotating a drive shaft affixed to the substrate of the at least one cutting element.

31. The cutting element assembly of claim 30, wherein the electric motor is powered by a generator that converts the flow of drilling fluids into electricity.

32. The cutting element assembly of claim 23, wherein the torque-generating assembly comprises:
   a cam assembly coupled to a drive shaft affixed to the substrate of the at least one cutting element; and
   an actuator assembly for actuating the cam assembly.

33. The cutting element assembly of claim 32, wherein the actuator assembly is electrically or hydraulically powered.

34. The cutting element assembly of claim 23, wherein the torque-generating assembly is powered by rotary motion of the cutting element assembly.

35. The cutting element assembly of claim 34, wherein the torque-generating assembly comprises:
   a rotatable sleeve mounted within an annular recess formed along the outer circumference of a bit body, the rotatable sleeve comprising a formation engaging portion configured to engage an inner circumferential surface of a borehole in a formation;
   a cam assembly having an undulating upper surface and mounted on the rotatable sleeve; and
   a cam follower in mechanical communication with the undulating upper surface of the cam assembly and coupled to a drive shaft affixed to the substrate of the at least one cutting element.

36. The cutting element assembly of claim 35, wherein the cam follower comprises a push rod biased by a resilient member and coupled to the drive shaft by a rack-and-pinion assembly.

37. The cutting element assembly of claim 35, wherein a formation engaging portion comprises natural diamond, tungsten carbide, or a polycrystalline diamond compact cutter.

38. The cutting element assembly of claim 23, wherein the substrate is substantially cylindrical.

39. The cutting element assembly of claim 23, wherein the superabrasive table comprises polycrystalline diamond and the substrate comprises cemented tungsten carbide.

40. The cutting element assembly of claim 23, wherein at least one helical groove is formed into at least a portion of an exterior surface of the substrate.

41. The cutting element assembly of claim 23, wherein the torque-generating assembly is configured to continuously or periodically apply torque to the substrate of the at least one cutting element.

42. A method of rotating a cutting element coupled to a drill bit for drilling a subterranean formation, the method comprising:
   providing a cutting element comprising a substantially cylindrical, superabrasive table bonded to a substrate;
   coupling the substrate of the cutting element to a drill bit body; and
   applying torque directly to the substrate and rotating the cutting element relative to a bit body of the associated drill bit.

43. The method of claim 42, wherein applying torque to the substrate of the cutting element comprises:
   providing a torque-generating assembly; and
   applying a torque to the substrate of the cutting element using the torque-generating assembly.

44. The method of claim 42, wherein applying torque to the substrate of the cutting element comprises constantly or periodically applying torque to the substrate of the culling element.

45. The method of claim 42, wherein applying torque to the substrate of the cutting element comprises generating torque from a rotary motion of the drill bit.

46. The method of claim 42, wherein providing the cutting element comprises providing a cutting element including at least one helical groove formed into at least a portion of an exterior surface of the substrate of the cutting element.

47. The method of claim 42, wherein the torque-generating assembly includes a push rod coupled to an actuator assembly, and applying a torque to the cutting element includes actuating the actuating assembly to engage at least one engagement feature formed in the substrate of the at least one cutting element with the push rod.

48. The method of claim 47, wherein the push rod is flexible and biased toward the at least one engagement feature formed in the substrate of the at least one cutting element, wherein applying a torque to the cutting element includes maintaining contact between the substrate and the push rod resulting from the bias of the push rod.

49. The method of claim 47, wherein applying a torque to the cutting element includes reciprocating the push rod relative to the substrate of the at least one cutting element.

50. A method of cutting a material, the method comprising:
   providing a cutting element comprising a substantially cylindrical, superabrasive table bonded to a substrate;
   cutting a material with the cutting element; and
   rotating the cutting element relative to a bit body by applying torque directly to the substrate of the cutting element while cutting the material with the cutting element.

51. The method of claim 50, wherein applying torque to the cutting element comprises:
   providing a torque-generating assembly;
   applying a torque to the cutting element using the torque-generating assembly.

52. The method of claim 51, wherein the torque-generating assembly includes a push rod coupled to an actuator assembly, and applying a torque to the cutting element includes actuating the actuating assembly to engage at least one engagement feature formed in the substrate of the at least one cutting element with the push rod.

53. The method of claim 52, wherein the push rod is flexible and biased toward the at least one engagement feature formed in the substrate of the at least one cutting element, wherein applying a torque to the cutting element includes maintaining contact between the substrate and the push rod resulting from the bias of the push rod.

54. The method of claim 52, wherein applying a torque to the cutting element includes reciprocating the push rod towards and away from the substrate of the at least one cutting element.

55. The method of claim 50, wherein cutting the material comprises machining the material.

56. The method of claim 55, wherein machining the material comprises performing a lathe operation, a drilling operation, or a planing operation.

57. The method of claim 55, wherein machining the material comprises machining a rock formation or a metal.

58. The method of claim 50, wherein cutting the material comprises drilling a subterranean formation with the bit body.

* * * * *